(12) United States Patent
Kapgan

(10) Patent No.: US 6,857,943 B2
(45) Date of Patent: Feb. 22, 2005

(54) BURR REMOVAL APPARATUS

(76) Inventor: Michael Kapgan, 1419 St. Kitts La., Foster City, CA (US) 94044

( * ) Notice: Subject to any disclaimer, the term of this patent is extended or adjusted under 35 U.S.C. 154(b) by 0 days.

(21) Appl. No.: 10/329,062

(22) Filed: Dec. 23, 2002

(65) Prior Publication Data
US 2003/0207653 A1 Nov. 6, 2003

Related U.S. Application Data

(63) Continuation of application No. PCT/US01/20803, filed on Jun. 28, 2001, which is a continuation-in-part of application No. 09/850,908, filed on May 7, 2001
(60) Provisional application No. 60/214,829, filed on Jun. 28, 2000.

(51) Int. Cl.$^7$ .................................................. B24B 1/00
(52) U.S. Cl. ........................... 451/61; 451/51; 451/57; 451/439
(58) Field of Search ..................... 451/61, 51, 57, 451/430, 431, 439, 461, 462

(56) References Cited

U.S. PATENT DOCUMENTS

| 2,514,394 | A | | 7/1950 | Irving |
|---|---|---|---|---|
| 3,871,139 | A | | 3/1975 | Rands |
| 4,136,487 | A | * | 1/1979 | Khokhulin et al. ......... 451/121 |
| 4,286,416 | A | * | 9/1981 | Cooper, Jr. ................. 451/466 |
| 4,343,577 | A | | 8/1982 | Purdon |
| 4,690,594 | A | | 9/1987 | Kato |
| 4,993,196 | A | * | 2/1991 | Kobayashi et al. ........... 451/61 |
| 5,022,188 | A | * | 6/1991 | Borst .......................... 451/342 |
| 5,177,904 | A | * | 1/1993 | Nagel et al. .................. 451/27 |
| 5,321,918 | A | * | 6/1994 | Brian .......................... 451/51 |
| 5,482,498 | A | * | 1/1996 | Higashikawa ................ 451/61 |
| 5,681,209 | A | * | 10/1997 | Naumann et al. ............. 451/51 |
| 5,795,217 | A | | 8/1998 | LaPlante et al. |
| 5,895,311 | A | * | 4/1999 | Shiotani et al. ................ 451/5 |
| 5,899,796 | A | * | 5/1999 | Kamiyama et al. .......... 451/61 |
| 6,616,508 | B1 | * | 9/2003 | Kamamura et al. ............ 451/8 |

FOREIGN PATENT DOCUMENTS

| DE | 199 04 944 A1 | | 2/1999 | |
|---|---|---|---|---|
| JP | 352053594 A | * | 4/1977 | .................. 451/61 |
| JP | 05 301173 A | | 11/1993 | |
| JP | 08 192344 A | | 7/1996 | |

OTHER PUBLICATIONS

LaRoux K. Gillespie, Deburring and Edge Finishing Handbook, 1999, pp. 237–288.
International Search Report; PCT/US01/20803.

* cited by examiner

Primary Examiner—Joseph J. Hail, III
Assistant Examiner—Anthony Ojini
(74) Attorney, Agent, or Firm—Knobbe, Martens, Olson & Bear LLP

(57) ABSTRACT

Apparatus for removing a burr from an edge of a workpiece comprising a rotating shaft, an abrasive mechanism along a distal end portion of the shaft, and a non-abrasive collar provided along the abrasive mechanism. The non-abrasive collar protects the wall of the workpiece from unintentional abrasion while the rotating abrasive mechanism is advanced into position for deburring. A proximal end of the rotating shaft may be attached to a flexible coupling member for allowing the shaft to deflect when a lateral force is exerted on the apparatus by the wall of the workpiece. The cross-sectional shape of the abrasive mechanism may be curvilinear and/or polygonal, depending upon the shape of the edge to be deburred. Two or more different abrasive mechanisms and/or non-abrasive collars can be simultaneously attached to the shaft.

24 Claims, 19 Drawing Sheets

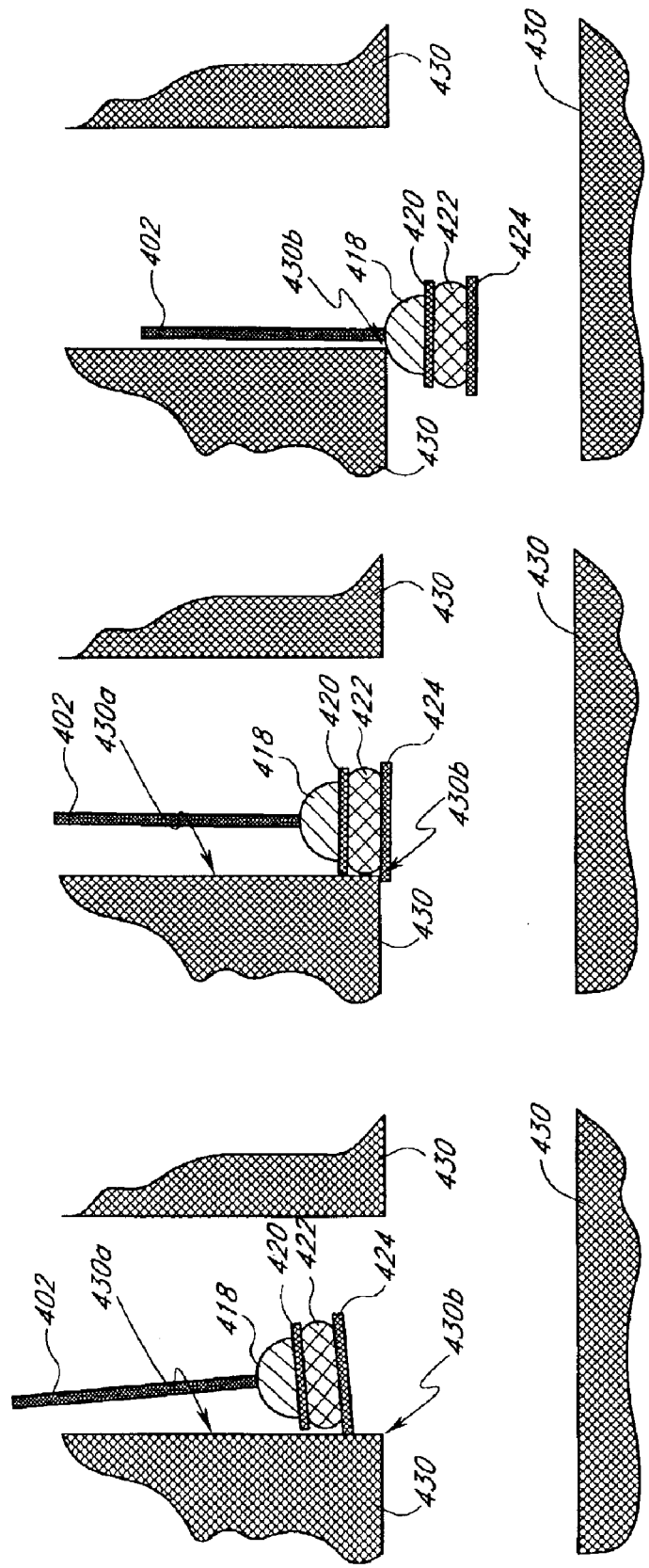

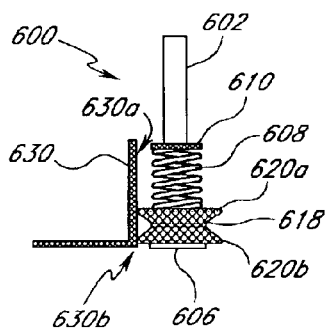 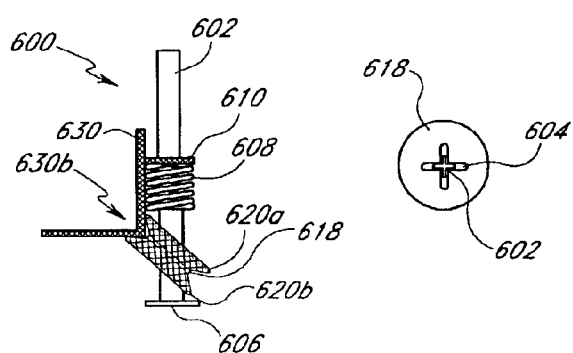
FIG.17A  FIG.17B  FIG.17C
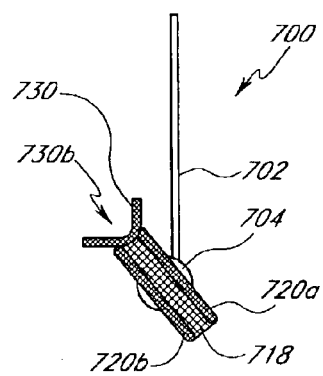 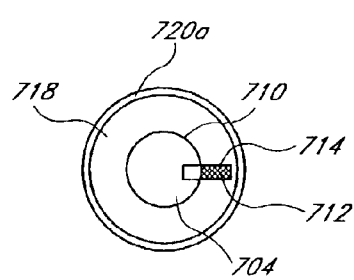
FIG.18A  FIG.18B

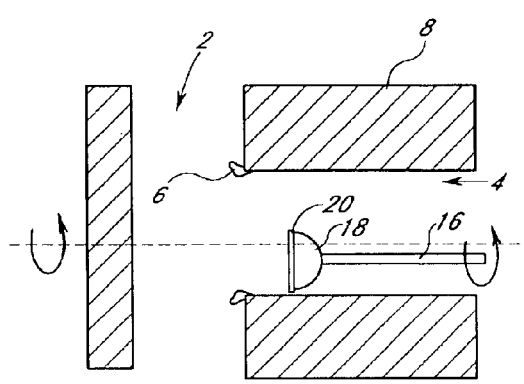
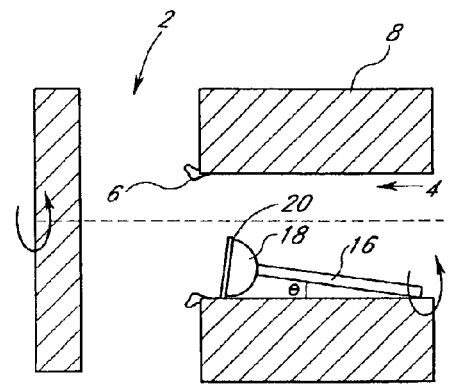
FIG.24A  FIG.24B
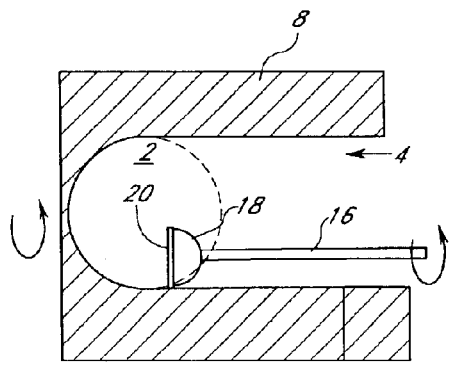
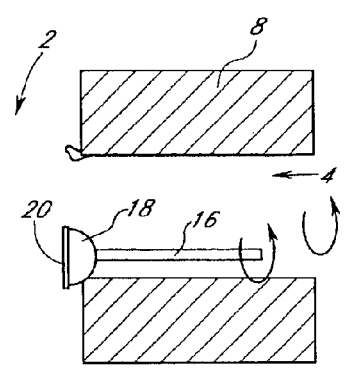
FIG.24C  FIG.24D

BURR REMOVAL APPARATUS

RELATED APPLICATIONS

The present application is a continuation, under 35 U.S.C. § 120, of International Application No. PCT/US01/20803, filed Jun. 28, 2001, which designates the United States and was published in English by the International Bureau on Jan. 3, 2002. This application is also a continuation-in-part of U.S. application Ser. No. 09/850,908, filed May 7, 2001, which claims the benefit of priority of U.S. Provisional Application No. 60/214,829, filed Jun. 28, 2000. Each of the above-referenced applications is hereby incorporated by reference in its entirety.

BACKGROUND OF THE INVENTION

1. Field of the Invention

This invention relates to removal of burrs and similar unwanted projections from metals and other relatively hard materials.

2. Description of the Related Art

Removal of undesirable projections (collectively referred to as "burrs" herein) from a surface, such as a metal or other relatively hard material, is extremely important in the metal finishing industry. The presence of an unremoved burr on the surface of a part can cause numerous problems such as, for example, interference with the flow of a liquid or difficulty with the positioning of electrical charge-carrying lines.

Producers of vehicles, such as automotive vehicles, waterborne vehicles and aircraft are especially concerned with burr removal from the inner surfaces of tubes, cylinders and other containers and housings. However, in some cases, burr removal can be very difficult to achieve due to the location of the surface containing burrs (referred to herein as a "burred surface"). Furthermore, a burred surface will often have an irregular shape that makes burr removal very cumbersome and time consuming using existing burr removal tools. For example, when two intersecting apertures are drilled into a part, the breakthrough of the second aperture into the first aperture will produce a burred surface that is non-planar and is ellipsoid in shape. Due to the location and shape of this burred surface, the burrs located thereon cannot be easily abraded with a conventional burr removal tool.

Another significant problem is the unintentional scouring or gouging of a surface that may result during the advancement of a burr removal tool toward a burred surface. For example, when a burr removal tool is advanced through an aperture to remove a burr located within a part, the abrasive surface of the tool may inadvertently contact the wall of the aperture as the tool is advanced through the aperture, thereby removing material that is preferably left intact. Damage may also result when the rotating abrasive surface binds against a burr or other irregularity on the surface of the part and causes the tool to jump laterally or move in another uncontrollable manner.

Another difficulty with burr removal arises when it is necessary to use two or more different burr removal tools within a small space in a single container or housing. This commonly occurs when rough burr removal is to be followed by finishing, each requiring a different burr removal material or tool shape. Similarly, this difficult exists when a container includes two or more different materials, each with a burred surface that requires its own burr removal mechanism and associated material.

SUMMARY OF THE INVENTION

The preferred embodiments of the present apparatus provide a new and improved burr removal tool that is adapted to abrade surfaces on a workpiece that have been very difficult to access heretofore. The preferred embodiments also provide an apparatus for protecting the surfaces of a workpiece from unintentional scouring or damage as the tool is advanced into position and/or jumps laterally due to binding or slippage.

The burr removal tool generally comprises an access device (e.g., a working shaft), an abrasive surface and a non-abrasive member. The abrasive surface has a cross-sectional profile that is greater in size than the access device. The non-abrasive member has a cross-sectional profile that is greater in size than the abrasive surface. The non-abrasive member protects the workpiece from the abrasive surface as the tool is advanced toward a burr. The non-abrasive member prevents the abrasive surface from inadvertently contacting and abrading the workpiece and is therefore particularly useful when advancing the tool through a small opening (e.g., an aperture) or in situations wherein it is difficult to maintain the tool in a steady position. A significant advantage of the burr removal tool is the ability of the abrasive mechanism to selectively abrade surfaces that may be irregular in shape or located in difficult regions within a workpiece. Although the tool is described with respect to burr removal, the tool may also be used for abrading a wide variety of other surfaces.

In accordance with one aspect of the present apparatus, a burr removal tool is presented generally comprising a rotatable access device, an abrasive mechanism disposed along the distal end portion of the access device and a non-abrasive member for protecting the workpiece against undesirable abrasion. The access device is preferably in the form of an elongate working shaft that is rotatable along the longitudinal axis at a selectable angular velocity. The abrasive mechanism is desirably approximately cylindrically symmetric in shape and has an exposed abrasive surface (preferably with Mohs hardness at least about 5.5). The non-abrasive member is made of a relatively non-abrasive material (preferably with Mohs hardness much less than 5.5) for protecting the surface from undesirable scouring or gouging.

In variations of the present apparatus, the non-abrasive member may be mounted on the abrasive mechanism or on the elongate access device. In one preferred embodiment, the non-abrasive member is mounted distal to the abrasive mechanism and has an outer perimeter that is circular in shape. In one particular embodiment, the non-abrasive member is provided in the form of a collar that extends around an exterior of the abrasive mechanism.

In another aspect of the present apparatus, the access device is deflectable and can be bent or deformed or tilted as the access device rotates to help expose the abrasive mechanism to a burred surface. In one embodiment, the access device includes a relatively inflexible shaft that is attached to a flexible coupling member. The flexible coupling member allows the access device to deflect and therefore facilitates access to regions within a part that are difficult or impossible to reach with conventional tools. The flexible coupling member also may be used to apply a bias force on the abrasive mechanism to improve and ensure smooth and consistent contact with a burred surface during burr removal. The flexible coupling member may be formed of a flexible material, such as rubber, or may be mechanical, such as a flexible spring or a flexible chuck. In another embodiment, at least a portion of the access device is formed of a flexible material that allows the distal portion of the access device to bend.

In another aspect of the present apparatus, the burr removal tool includes two or more different abrasive mechanisms on a single access device. This aspect allows for the removal of burrs and finishing of the surface without exchanging tools.

In another aspect of the present apparatus, the burr removal apparatus is sized to be small and versatile enough to permit the rapid interchange of one type of abrasive mechanism with another within a small space or aperture.

In another aspect of the present apparatus, the cross-sectional shape of the abrasive mechanism is formed to minimize undesirable removal of adjacent material from the surface of a workpiece. Various cross-sections of the abrasive mechanism may include ovular, quadrilateral, trapezoidal or polygonal.

In another aspect of the present apparatus, a shaft restrictor is provided to control or prevent lateral excursions of the rotating access device. This aspect prevents the abrasive mechanism from jumping or wobbling and thereby protects the workpiece against inadvertent removal of material and ensures smooth movement of the abrasive mechanism.

In another aspect of the present apparatus, an additional rotatable mass (e.g. flywheel) is provided to maintain the angular velocity of the tool in the presence of frictional forces, even after a rotational drive mechanism is turned off or disconnected.

In another aspect of the present apparatus, two or more approximately cylindrically symmetric abrasive mechanisms are separated by a space or by a non-abrasive collar and are attached to an access device. Optionally, each of the abrasive mechanisms includes a different abrasive material or a different roughness or grade of the same material. Therefore, the same burr removal apparatus can be applied to different surfaces or materials without removing the burr removal apparatus to change the abrasive mechanism.

In another aspect of the present apparatus, the abrasive mechanism comprises a brush having one or more projections or bristles attached to and extending radially from the working shaft. The projections may be formed of an abrasive material or, alternatively, each of the projections may be formed with an abrasive nodule at the tip.

In another aspect of the present apparatus, the preferred embodiments also provide a burr removal tool that is safe, reliable, convenient to use and inexpensive to manufacture.

In yet another aspect, a method for removing a burr from an edge of a workpiece is provided. The method involves providing an access device with an abrasive mechanism disposed along the distal end portion. The abrasive mechanism includes an abrasive material that can abrade an edge of a workpiece. In addition, a non-abrasive member is provided wherein the non-abrasive mechanism has a cross-sectional profile that is greater in size than the abrasive mechanism. The access device and abrasive mechanism are rotated and the tool is advanced toward a selected region of a workpiece. The non-abrasive member may engage a wall of the workpiece during advancement toward the selected region. As the non-abrasive member is advanced beyond an edge of the workpiece, the abrasive mechanism comes into contact with the workpiece and is used to remove a burr or other material therefrom.

In a variation of the method, the workpiece having the burred surface located thereon may be deburred by rotating the workpiece instead of, or independently of, the rotating access device.

BRIEF DESCRIPTION OF THE DRAWINGS

FIGS. 15A–C are side views of the abrasive mechanism of FIG. 14 during use on a workpiece.

FIGS. 17A–B are side view of another embodiment of an abrasive mechanism that can be pivoted about the working shaft.

FIG. 17C is a top view of the abrasive mechanism of FIGS. 17A–B showing how the coupling between the abrasive mechanism and the working shaft.

FIGS. 18A is a side view of another embodiment of an abrasive mechanism that can be pivoted about a spherical ball attached to the distal end of the working shaft.

FIG. 18B is a cross-sectional view showing the coupling between the ball and the abrasive mechanism.

FIGS. 24A–D are cross-sectional views sequentially illustrating the use of one preferred embodiment of the present invention for removing burrs from a location where two apertures intersect in a workpiece.

DETAILED DESCRIPTION OF THE PREFERRED EMBODIMENT

Figure 1A:
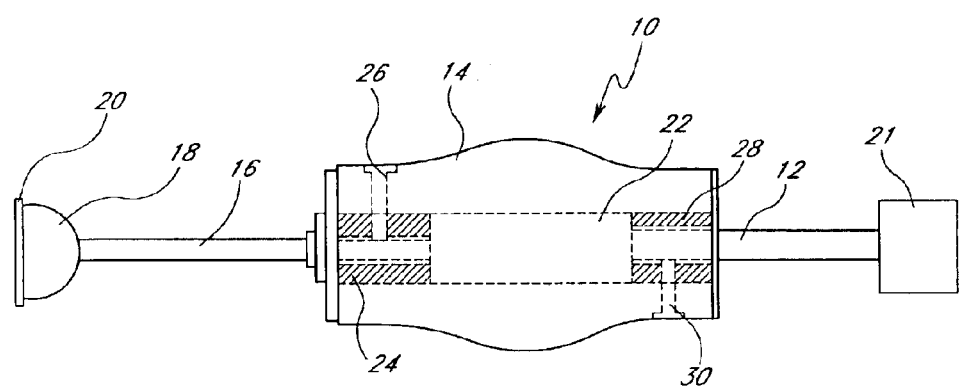
FIG. 1A is a side cross-sectional view of one embodiment of the burr removal apparatus of the present invention.
Figure 1B:
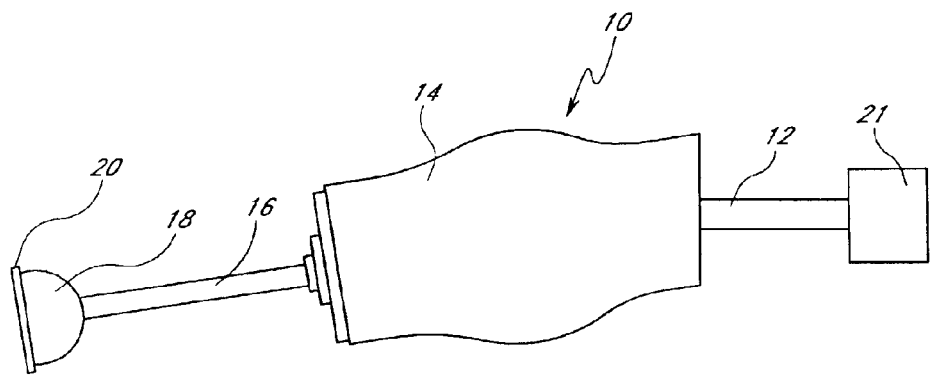
FIG. 1B is a side view of the burr removal apparatus of FIG. 1A wherein the working shaft is deflected relative to the drive shaft.

FIGS. 1A and 1B illustrate a first preferred embodiment of a burr removal apparatus 10 in accordance with the present invention. The apparatus 10 includes a drive shaft 12, a flexible coupling member 14, a working shaft 16, an approximately cylindrically symmetric abrasive mechanism 18 concentrically attached to the distal end of the working shaft 16, and a non-abrasive member in the form of a collar 20. The entire apparatus 10 is caused to rotate, for example, using a shaft driver (rotator) mechanism 21, such as a motor, that is coupled to the proximal end of the drive shaft 12.

The collar 20 is mounted on the distal end of the abrasive mechanism 18 and is made of a non-abrasive material that will not significantly abrade the surface of the workpiece. The purpose of the collar 20 is to protect the surface of a workpiece from unintentional scouring or gouging as the burr removal apparatus 10 is advanced along or through the workpiece toward a burred surface. The collar 20 may be coupled to the abrasive mechanism 18 by any suitable means, such as, for example, brazing, welding or mechanically connected (e.g. snap-on).

It will be appreciated that other types of non-abrasive members may be used in place of the collar while still achieving the desired purpose of protecting the workpiece. Any type of non-abrasive member will suffice wherein the non-abrasive member has a diameter that is greater than the diameter of the abrasive mechanism. In alternative configurations, the non-abrasive member may be mounted to the shaft rather than to the abrasive mechanism. In other alternative configurations, the non-abrasive member may be coupled to the apparatus via a bearing mechanism, such that the non-abrasive member does not rotate along with the abrasive mechanism.

Referring still to FIGS. 1A and 1B, the abrasive mechanism 18 includes an abrasive surface adapted to remove burrs or other unwanted material from the surface of a workpiece. In the illustrated embodiment, the abrasive mechanism 18 is shown having a hemi-spherical shape that is particularly well-suited for removing burrs that are located at the intersection of two circular apertures within a workpiece. It will be appreciated, however, that other types and shapes of abrasive mechanisms may be used with the present apparatus.

The flexible coupling member 14 can be made of any suitable material, such as, for example, rubber. The purpose of the flexible coupling member 14 is to transfer torque from the drive shaft 12 to the working shaft 16 while providing the working shaft 16 with the ability to deflect relative to the drive shaft 12, as illustrated in FIG. 1B. The embodiment of the flexible coupling member 14 illustrated in FIG. 1A is formed with a hollow core 22 (i.e. a lumen) extending lengthwise therethrough. A first bushing 24 is located in the distal end of the core 22 for housing the proximal end of the working shaft 16. A first set screw 26 is provided for maintaining the working shaft 16 in the first bushing 24. A second bushing 28 is located in the proximal end of the core 22 for housing the distal end of the drive shaft 12. A second set screw 30 is provided for maintaining the drive shaft 12 in the second bushing 28. The set screws 26, 30 may be loosened to remove one or both of the shafts from the bushings 24, 28 to interchange parts as desired for a particular burr removal application.

Figure 2A:
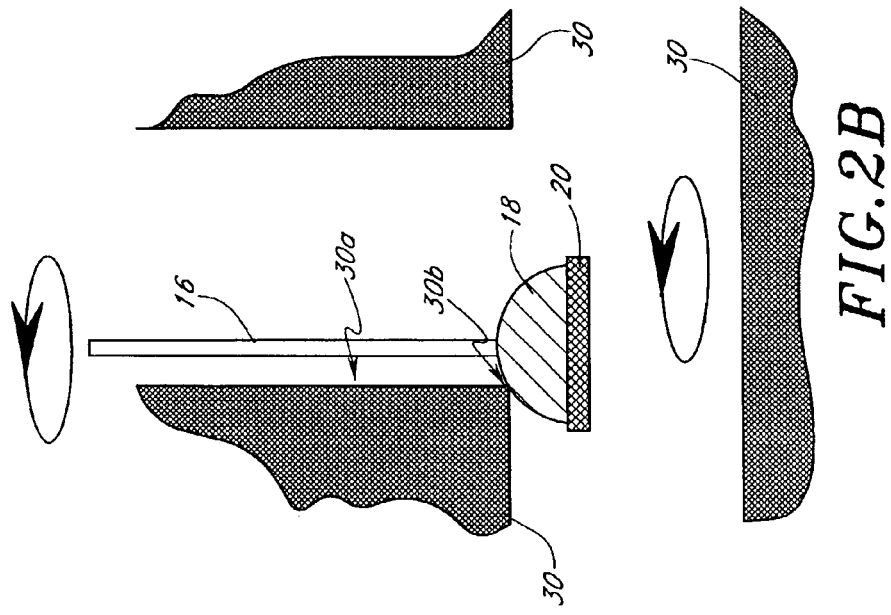
FIG. 2A is a side view of the distal end portion of the burr removal apparatus of FIG. 1 wherein the abrasive mechanism is being advanced into a workpiece.
Figure 2B:
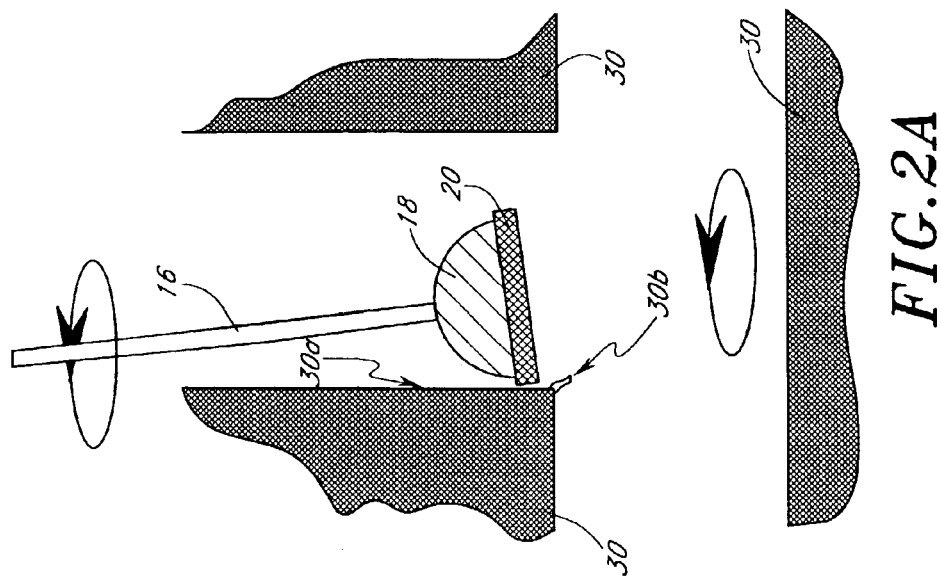
FIG. 2B is a side view of the distal end portion of the burr removal apparatus of FIG. 1A wherein the abrasive mechanism is in contact with the corner of a workpiece.

FIGS. 2A and 2B illustrate one preferred use of the embodiment of the apparatus just described for removing burrs in a relatively inaccessible space. FIGS. 2A illustrates the working shaft 16 as it is being advanced into position through an aperture or opening for deburring an edge 30B of the aperture at a location where two apertures intersect in a workpiece 30. As shown in FIG. 2A, the non-abrasive collar 20 prevents the rotating abrasive mechanism 18 from scouring, gouging or otherwise removing materials from the wall 30A of the aperture during advancement. The working shaft 16 is deflected relative to the wall 30A due to a lateral force applied to the collar 20 by contact with the wall 30A of the aperture.

When the abrasive mechansim 18 has been advanced into the desired location, as shown in FIG. 2B, the rotating abrasive mechansim 18 contacts the edge of the aperture 30B containing burrs. The abrasive mechanism 18 rides along the edge 30B until all the burrs located thereon are removed. In FIGS. 2A and 2B, this procedure is performed while rotating the workpiece around a central axis of the aperture (as shown by the lower arrows). The workpiece is rotated such that the abrasive mechanism contacts the entire edge of the aperture. In the illustrated embodiment, the curved outer surface of the abrasive mechanism 18 has a cross-sectional shape that is formed to assure that the burrs located on the edge 30B are completely abraded as the workpiece is rotated.

In alternative configurations, the abrasive mechanism need not be approximately cylindrically symmetric and/or the working shaft need not be approximately concentrically attached to the abrasive mechanism. In either of these modified configurations, when the working shaft is rotated, a portion, but not all, of the abrasive mechanism will contact the surface to be abraded. Also, the working shaft need not be an elongated cylindrical member. Any apparatus capable of transmitting torque to the abrasive mechanism is intended to be within the scope of this invention.

FIGS. 3A through 5B illustrate various exemplary methods for removing burrs from the edge of an exit hole 34 in a workpiece 32 using the embodiment of the present apparatus illustrated with reference to FIGS. 1A and 1B. Each of these methods achieves the desired result of abrading the entire inner edge of the circular exit hole 34.

Figure 3A:
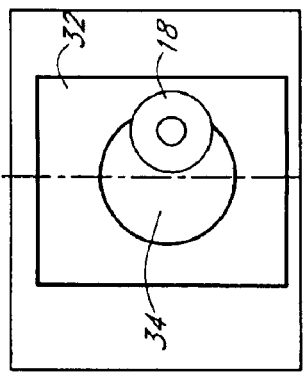
FIGS. 3A–B schematically illustrate a deburring method using one embodiment of the present invention wherein the workpiece is rotated relative to the abrasive mechanism.
Figure 3B:
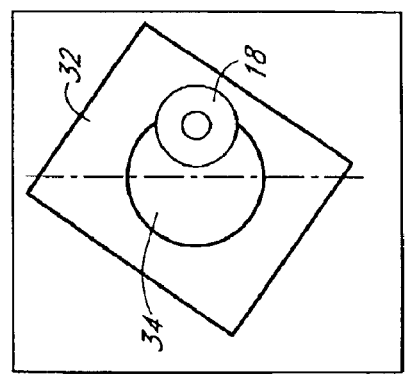

FIGS. 3A and 3B illustrate a first method wherein the abrasive mechanism 18 rotates in a fixed location about a stationary axis. While the abrasive mechanism 18 rotates, the workpiece 32 also rotates, preferably in the opposite direction, about an axis that is off center from the axis of rotation of the abrasive mechanism 18. FIG. 3A shows the abrasive mechanism 18 in a first position relative to the workpiece 32. FIG. 3B shown the workpiece 32 after being rotated approximately 45 degrees. With the workpiece 32 in this new position, the abrasive mechanism 18 is located at a different relative location within the exit hole 34. A lathe may be used in this method to facilitate gripping and rotating the workpiece 32, or the tool, or both.

Figure 4A:
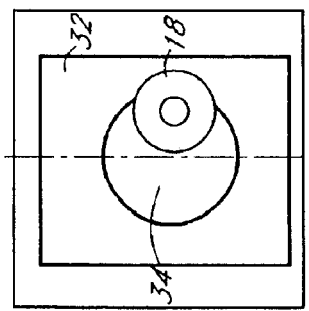
FIGS. 4A–B schematically illustrate a deburring method using one embodiment of the present invention wherein the abrasive mechanisms is moved relative to the workpiece.
Figure 4B:
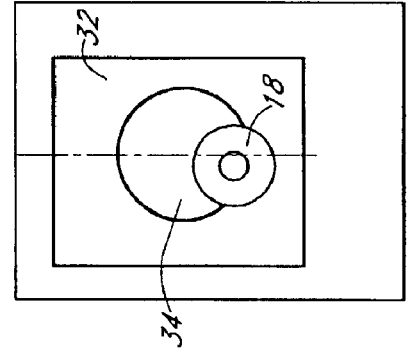

FIGS. 4A and 4B illustrate a second method for deburring the edge of an exit hole 34 in a workpiece 32. Using this method, the workpiece 32 is held stationary while the axis of rotation of the abrasive mechanism 18 is moved around the exit hole 34. FIG. 4A illustrates the abrasive mechanism in a first position relative to the exit hole 34. FIG. 4B illustrates the abrasive mechanism after the abrasive mechanism 18 has been moved to a different location such that it is in contact with a different region of the edge of the exit hole 34.

Figure 5A:
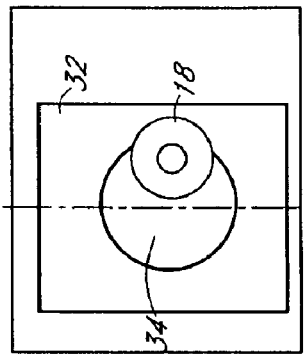
FIGS. 5A–B schematically illustrate a deburring method using one embodiment of the present invention wherein the workpiece is moved laterally relative to the abrasive mechanism.
Figure 5B:
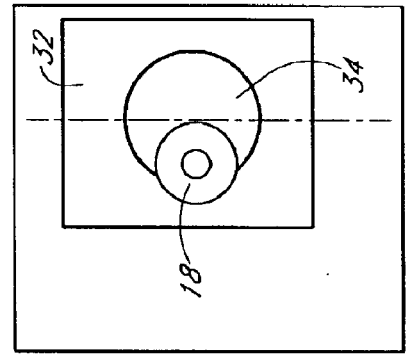

FIGS. 5A and 5B illustrate yet another method for deburring the edge of an exit hole 34 in a workpiece 32. Using this method, the axis of rotation of the abrasive mechanism 18 is stationary, however, the workpiece is moved laterally in an X-Y plane using, for example, a milling machine. FIG. 5A illustrates the abrasive mechanism 18 in a first position relative to the exit hole 34. FIG. 5B shows the workpiece 32 after being moved in the X-Y plane to a new location such that the abrasive mechanism 18 contacts a different region of the edge of the exit hole 34.

Figure 6B:
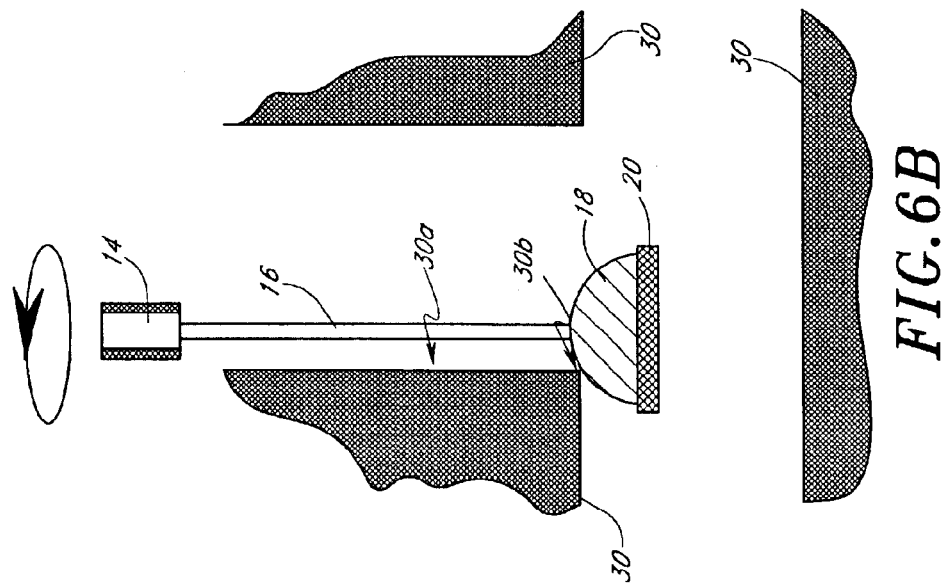
FIGS. 6A–B are side views of the burr removal tool with a rubber coupling member during use on a workpiece.
Figure 6A:
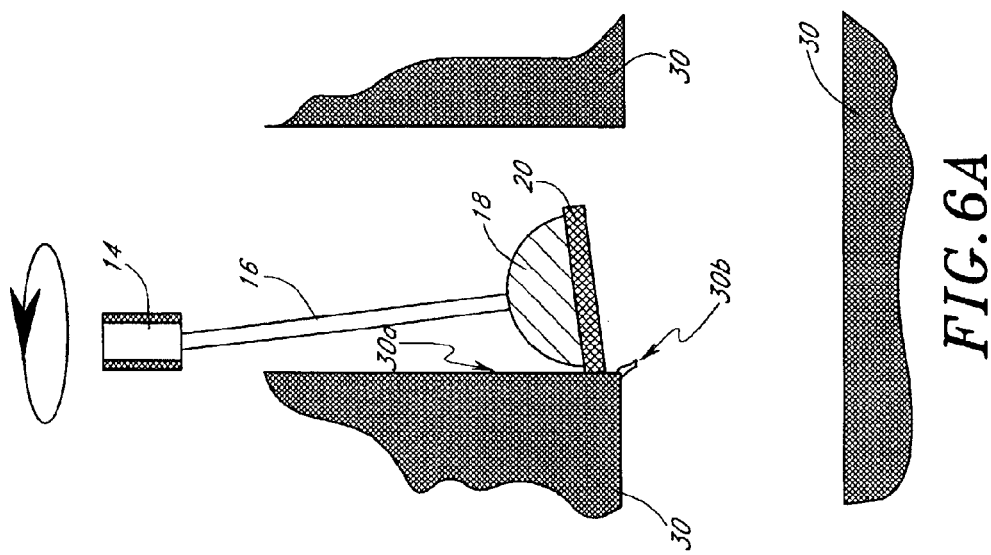

FIGS. 6A and 6B schematically illustrate in further detail the distal end portion of the burr removal apparatus described previously with reference to FIGS. 1A and 1B. The working shaft 16 is relatively inflexible and extends from the distal end of a flexible rubber (or other deformable material) coupling member 14. An abrasive mechanism 18 with a collar 20 mounted thereon is fixedly attached to the distal end of the shaft 16. The flexible coupling member 14 allows the working shaft 16 to deflect as the wall 30A of the workpiece 30 exerts a lateral force on the collar 20, as illustrated in FIG. 6A. The deflection of the working shaft 16 allows additional force to be applied in encouraging the abrasive mechanism 18 to contact the portion 30B of the workpiece 30 that is to be deburred. The flexible coupling member 14 exerts a reaction force which increases the surface contact as the abrasive mechanism 18 rides along the corner 30B of the workpiece 30, as illustrated in FIG. 6B.

Figure 7B:
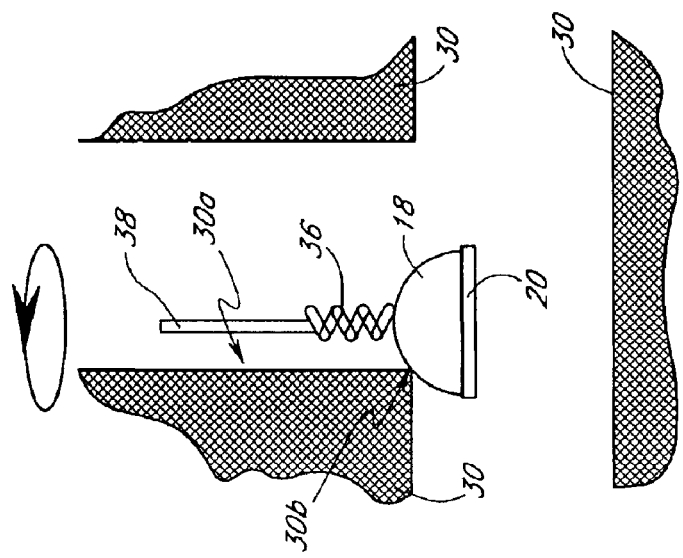
FIGS. 7A–B are side views of the burr removal tool with a coiled spring coupling member located between the working shaft and the abrasive mechanism.
Figure 7A:
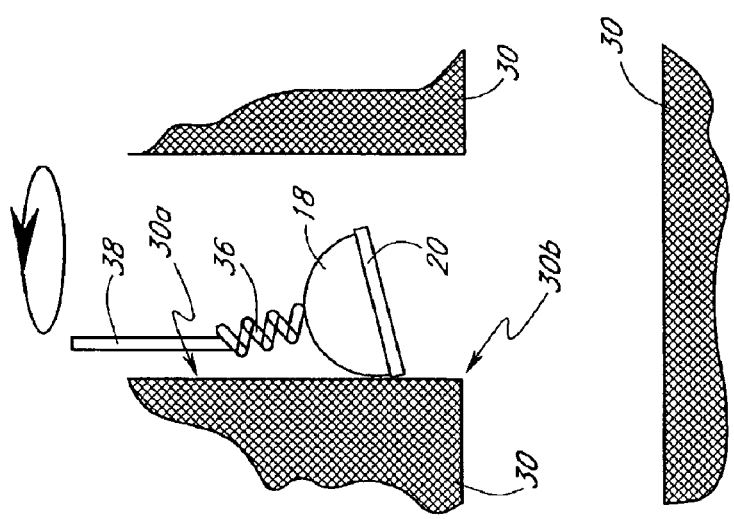

FIGS. 7A and 7B illustrate a first modification of a working shaft in accordance with another preferred embodiment of the present invention. This embodiment comprises a relatively inflexible rotatable working shaft portion 38, an abrasive mechanism 18, and a flexible shaft portion 36 positioned between and connected to the inflexible working shaft portion 38 and the abrasive mechanism 18. Preferably, the flexible shaft portion 36 is a flexible joint or spring that allows the abrasive mechanism to deflect relative to the inflexible shaft 38, as shown in FIG. 7A. A collar 20 of non-abrasive material extends laterally beyond the abrasive mechanism 18 to prevent the side wall 30A from scouring or gouging when the abrasive mechanism 18 is being moved into place or is being removed from a region adjacent to the workpiece 30. As the abrasive mechanism 18 contacts the corner 30B of the workpiece 30, the spring 36 exerts a force that encourages the abrasive mechanism 18 to contact and ride along the corner 30B, as shown in FIG. 7B.

Figure 8B:
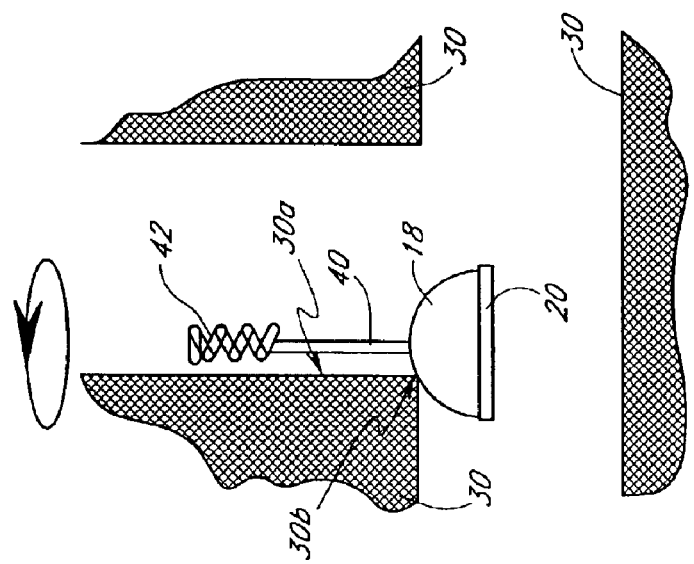
FIGS. 8A–B are side views of the burr removal tool with a coiled spring coupling member located at the proximal end of the working shaft.
Figure 8A:
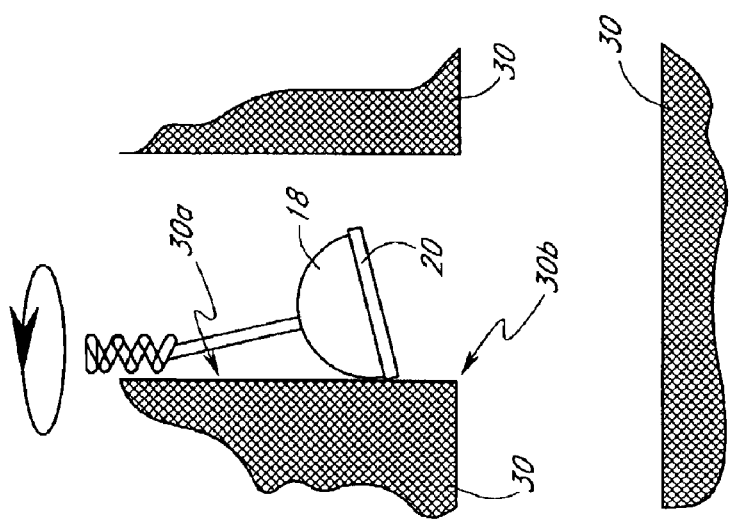

FIGS. 8A and 8B illustrate a second modification of a working shaft in accordance with another preferred embodiment of the present invention. In this modification, a rotatable inflexible shaft portion 40 may be positioned between a flexible shaft portion 42 and an abrasive mechanism 18 with a collar 20 mounted thereon. FIG. 8A illustrates the device as the abrasive mechanism 18 is advanced along a side wall 30A in an aperture of a workpiece 30. FIG. 8B illustrates the device as the abrasive mechanism 18 is advanced around the corner 30B of the workpiece 30.

In any of the embodiments shown in FIGS. 7A, 7B, 8A and 8B, the shaft may have a hollow core that partly or fully surrounds the spring. A shaft core may include one, or more than one, spring. A shaft core may include a flexible shaft portion and a substantially inflexible shaft portion. In any of the embodiments disclosed herein, the non-abrasive member may be a substantially annular disk (i.e., a collar) or may be a substantially solid disk (i.e., a plate).

Figure 9B:
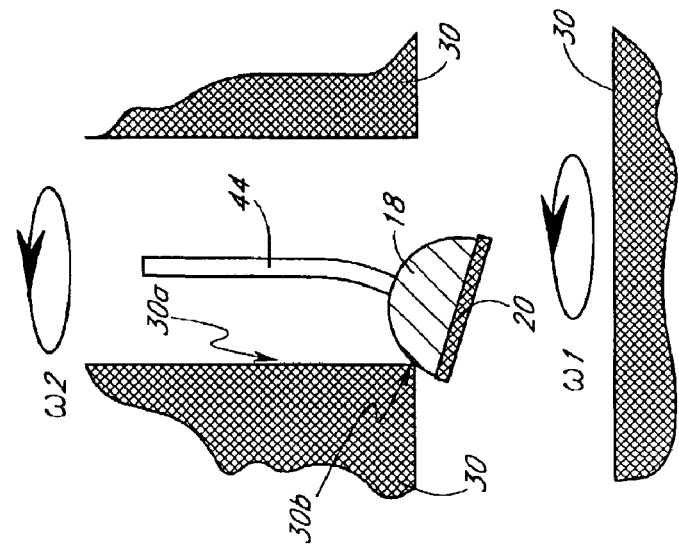
FIGS. 9A–B are side views of the burr removal tool with a flexible working shaft.
Figure 9A:
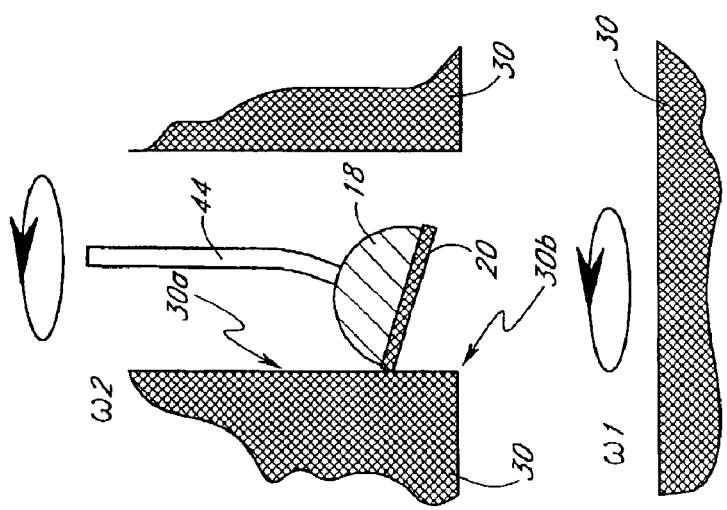

FIGS. 9A and 9B illustrate a third modification of a working shaft in accordance with another preferred embodiment of the present invention. In this modification, at least a portion of the working shaft 44 is relatively flexible. In accordance with this preferred embodiment, the shaft may be formed of any suitable material including, for example, a steel cable, a coiled spring, and a hard rubber.

The embodiment shown in FIGS. 9A and 9B illustrates another method for removing burrs from an aperture in a workpiece 30. FIG. 9A illustrates a workpiece 30 with an aperture having a side wall 30A. The workpiece 30 is rotating about the center line of the aperture at a first angular velocity $\omega 1$. The rotatable shaft 44 with abrasive mechanism 18 and collar 20 is advanced along the center line of the aperture in the workpiece 30. The working shaft 44 is rotating at a second angular velocity $\omega 2$. Preferably, the workpiece 30 and the abrasive mechanism 18 are rotating in opposite circumferential directions (e.g., clockwise and counterclockwise, respectively) with angular velocities specifically chosen for the particular application. Alternatively, both the workpiece 30 and the abrasive mechanism 18 may be rotating in the same direction with different angular velocities ($\omega 1 - \omega 2$). In either case, as the flexible working shaft 14 is spun at an angular velocity $\omega 2$, rotation of the substantial mass of the abrasive mechanism 18 at the distal end of the working shaft 44 will inevitably produce some asymmetry in the rotational position of the abrasive mechanism 18. This asymmetry causes the distal end of the working shaft 44 to differ in direction and/or in its lateral location relative to the proximal end of the shaft. As a result, the abrasive mechanism 18 will "wobble" as it spins and will eventually come into contact with a side wall 30A of the workpiece 30. The working shaft 44 is then advanced further through the aperture such that the abrasive mechanism 18 "wobbles" around the opening in the aperture to remove burrs along the corner 30B.

Tool Variations
Spherically-Shaped Abrasive Mechanism

Figure 10:
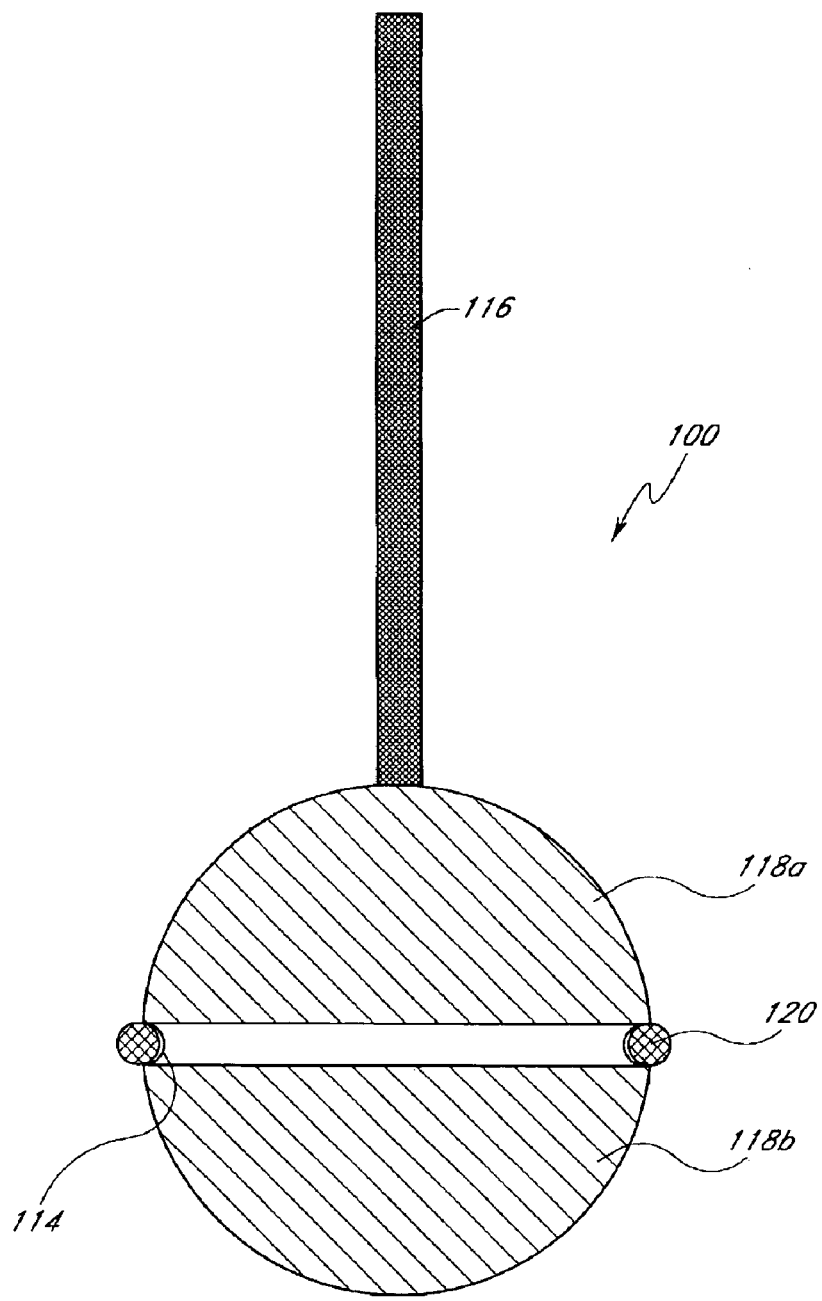
FIG. 10 illustrates another embodiment of an abrasive mechanism having a spherical shaped abrasive mechanism with a protective collar mounted thereon.

FIG. 10 illustrates the distal end portion 100 of a burr removal apparatus in accordance with another preferred embodiment of the present invention. A working shaft 116, preferably inflexible, is attached to a first approximately cylindrically symmetric abrasive mechanism 118A, and the shaft and/or the first abrasive mechanism is attached or connected to a second approximately cylindrically symmetric mechanism 118B. The first and second abrasive mechanisms, 118A and 118B, are spaced apart by a groove 114, or by empty space if desired. A non-abrasive collar or snap ring 120 is positioned between, or adjacent to, the first and second abrasive mechanisms, 118A and 118B. The first and second abrasive mechanisms, 118A and 118B, may be formed with the same abrasive material or different abrasive materials, as desired.

If the abrasive materials for the two mechanisms are different, the first abrasive mechanism 118A and the second abrasive mechanism 118B may be used for different purposes on the same workpiece. For example, the second abrasive mechanism 118B may be used for rough burr removal from a surface and the first abrasive mechanism 118A may be used for smoothing and finishing of the same or different surface. In addition, the second abrasive mechanism 118B serves another purpose. When the tool 100 is being moved into position in an aperture or opening, passage of the tool through the aperture may be blocked by one or more burrs that extend laterally from a side wall or surface that partly defines the aperture. When such blockage occurs, the second abrasive mechanism 118B may be rotated and advanced to remove, or reduce the size of, the projections so that the tool can be moved to its desired location within the aperture. The first abrasive mechanism 118A can be used for a similar purpose when the tool is moving in the opposite direction through a workpiece.

As described with reference to the previously illustrated embodiments, the collar 120 between the first and second abrasive mechanisms, 118A and 118B, protects a surface from unintentional scouring and gouging. In this embodiment, the collar 120 also ensures that a surface is exposed to at most one of the two abrasive mechanisms, 118A or 118 at any one time.

Figure 11B:
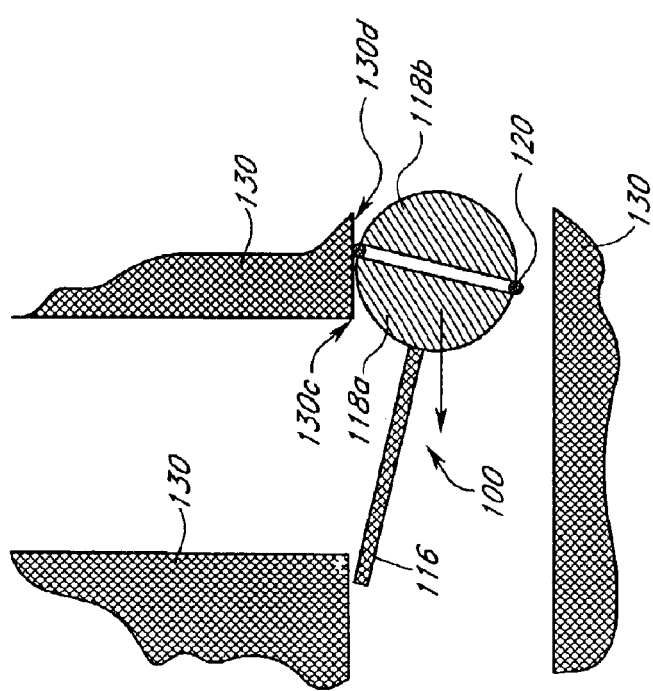
FIG. 11A–B are side views of the abrasive mechanism of FIG. 10 during use on a workpiece.
Figure 11A:
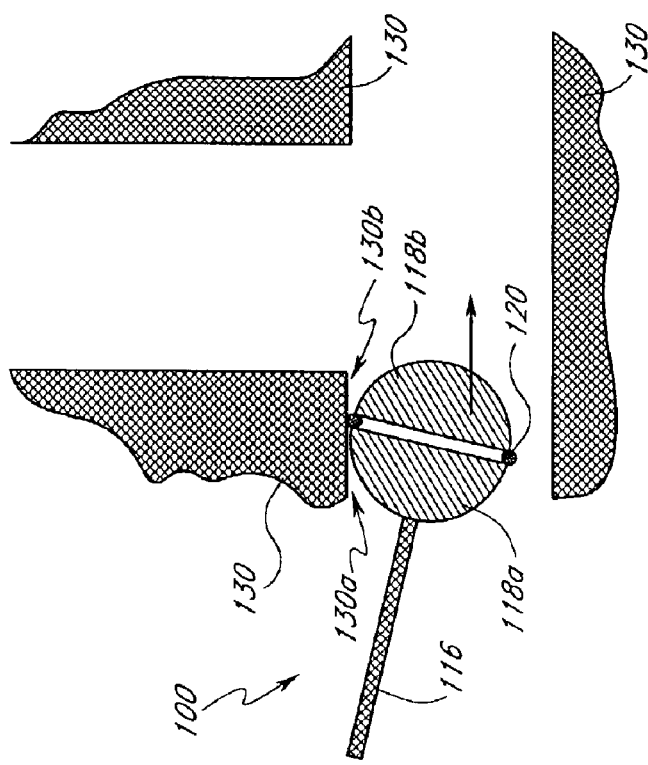

One preferred use of this embodiment 100 is illustrated in FIGS. 11A and 11B. The distal end portion 100 of the burr removal tool is inserted into an aperture or hole such that the collar 120 rides along the wall 130A of a workpiece 130, as illustrated in FIG. 11B and shown by the arrow. After the collar 120 is advanced beyond the corner 130B, the first abrasive mechanism 118A comes into contact with the corner 130B to remove burrs located thereon.

In a feature unique to this apparatus, the distal end portion 100 may then be advanced further into the aperture until the collar 120 is located distal to the corner 130C of the workpiece 130. The device is then retracted such that the collar 120 rides along the wall 130D of the workpiece 130, as illustrated in FIG. 11B and shown by the arrow. When the collar 120 is retracted proximal to the corner 130C, the second abrasive mechanism 118B comes into contact with the corner 130C to remove burrs located thereon. It will be appreciated that the removal of burrs from corner 130C would not be possible without the second abrasive mechanism 118B unless the tool was inserted from the opposite direction. Therefore, this embodiment of the present invention advantageously allows for the removal of burrs in a workpiece by entry into the aperture from either direction.

Multiple Abrasive Mechanisms on a Working Shaft

Figure 12:
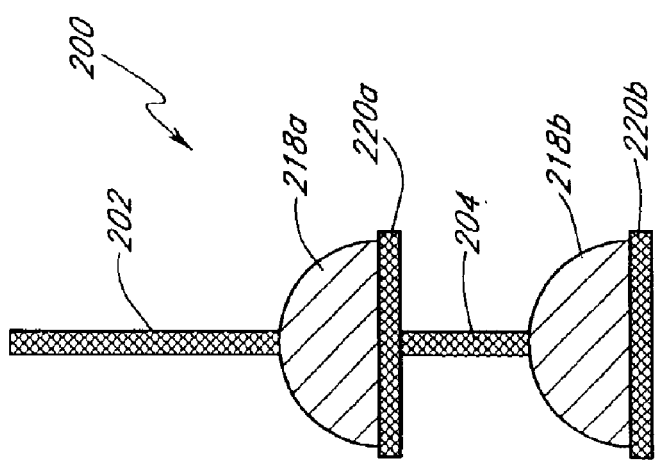
FIG. 12 is a side view of another embodiment of an abrasive mechanism having two abrasive mechanisms mounted at the distal end of the working shaft.

FIG. 12 illustrates the distal end portion 200 of a burr removal apparatus in accordance with another preferred embodiment of the present invention. This apparatus includes a first shaft 202 and a second shaft 204, with one or both of the shafts preferably being inflexible and preferably being approximately concentric. In one variation, the first and second shafts, 202 and 204, are parts of a single, unitary shaft. One or both of the shafts, 202 and 204, are attached or connected to a first abrasive mechanism 218A, which has a first non-abrasive collar 220A. The second shaft 204 is attached or connected to a second abrasive mechanism 218B that is contiguous to or spaced apart from the first abrasive mechanism 218A and that has a second non-abrasive collar 220B. The first and second abrasive mechanisms, 220A and 220B, may have the same abrasive materials or may have different abrasive materials.

This embodiment may be used to provide two different abrasive materials on a single tool. By having two types of abrasive materials on a single tool, two different types of abrasion can be performed, such as, for example, burr removal and polishing without changing the tool. This embodiment may also be used to abrade two different types of surfaces on a workpiece which each require different abrasive materials.

Abrasive Brush Mechanism

Figure 13:
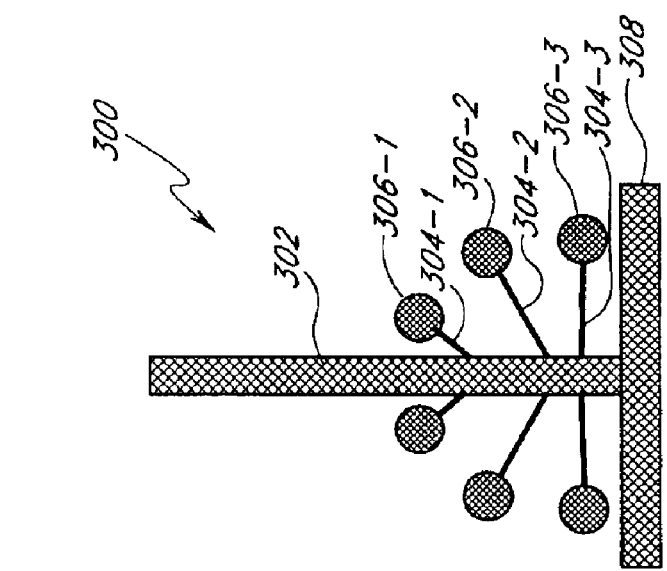
FIG. 13 is a side view of another embodiment of an abrasive mechanism having a plurality of projections with abrasive tips.

FIG. 13 illustrates the distal end portion 300 of a burr removal apparatus in accordance with another preferred embodiment of the present invention wherein an abrasive brush is used for burr removal. In this embodiment, a rotatable shaft 302 is provided with a plurality of laterally oriented rods or projections, 304-1, 304-2 and 304-3, that are anchored in, and extend horizontally or diagonally outwardly from, the shaft. Each of the projections, 304-1, 304-2 and 304-3, has an abrasive nodule, 306-1, 306-2 and 306-3, respectively, mounted at or near the end. As the shaft 302 rotates, one or more of the abrasive nodules, 306-1, 306-2 and 306-3, is caused to move outwardly by centrifugal force, to contact a burred surface and to thereby remove one or more burrs from the burred surface. This contact may occur because centrifugal force exerted on the nodules by the shaft rotation causes one or more of the projections, 304-1, 304-2 and 304-3, to bend. As the centrifugal force increases, each projection approaches an angle of 90 degrees relative to the shaft 302 and the corresponding nodules 306-1, 306-2 and 306-3 move as far as possible from the shaft 302.

A protective collar 308 is provided at the distal end of the working shaft 302 which prevents the abrasive nodules, 306-1, 306-2 and 306-3 from contacting the surface of the workpiece as the distal end portion 300 is advanced along or through the workpiece. In the illustrated embodiment, the abrasive nodules 306-1, 306-2 and 306-3 are located such that they contact the workpiece only after the collar 308 has been advanced over a corner of a workpiece such that they can move laterally into contact with the workpiece.

In an alternative embodiment of the apparatus, the abrasive brush is formed projections that have no abrasive nodules at the tips. In this embodiment, the projections are abrasive mechanisms themselves and are made of any suitable material such as, for example, stainless steel or nylon.

Figure 25B:
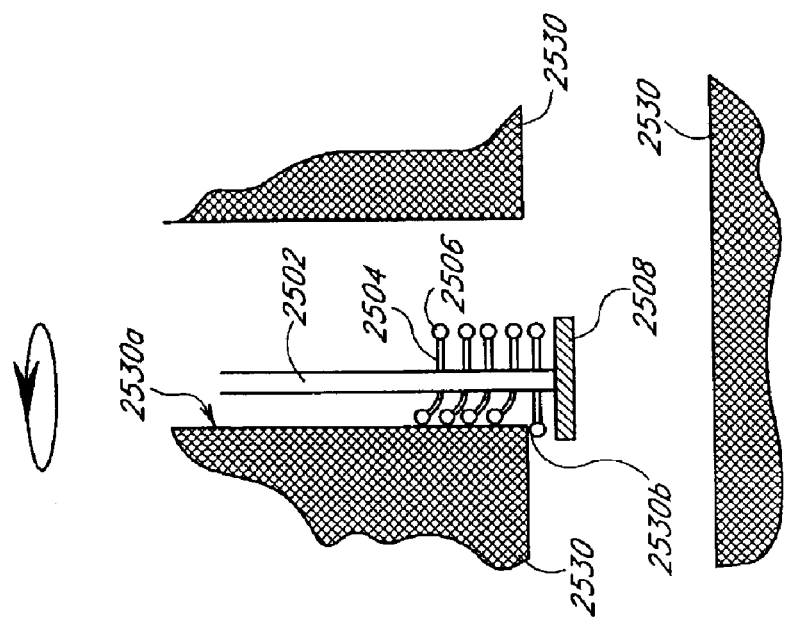
FIG. 25B is a side view of the embodiment shown in FIG. 25A wherein the abrasive nodules on the brush are in contact with the workpiece.
Figure 25A:
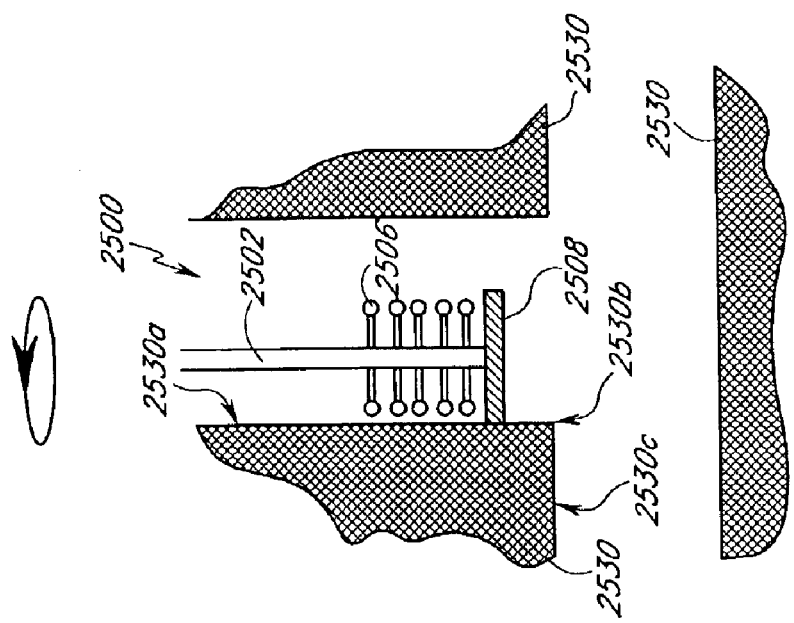
FIG. 25A is a side view of another embodiment of an abrasive mechanism in the form of a cylindrical brush being inserted into a workpiece.

FIGS. 25A and 25B illustrate another alternative embodiment of the apparatus wherein a cylindrically-shaped abrasive brush 2500 is provided at the distal end of a working shaft 2502. This type of brush is commonly referred to as a "wide-face brush" or a "cylinder brush." The brush 2500 includes a plurality of projections 2504 extending radially outward from the working shaft 2502. Each of the projections 2504 is preferably formed with abrasive nodules 2506 at the tips. A protective collar 2508 is provided at the distal end of the working shaft 2502 with an outer diameter that is larger than the outer diameter of the brush 2500. Because the diameter of the protective collar 2508 is larger than the diameter of the projections 2504, the abrasive nodules 2506 do not contact the wall 2530A of the workpiece 2530 while the brush 2500 is advanced through an aperture, as illustrated in FIG. 25A. However, as illustrated in FIG. 25B, when the protective collar 2508 is advanced beyond a corner 2530B of the workpiece 2530, the abrasive nodules 2506 come into contact with the workpiece 2530. As illustrated, some abrasive nodules may extend around the corner 2530B to contact wall 2530C, thereby removing all burrs located in the region of the corner 2530B. Alternatively, the brush 2500 illustrated in FIGS. 25A and 25B may be formed without abrasive nodules wherein the projections are abrasive mechanisms themselves.

In another alternative of the apparatus, a second collar (not shown) may be provided proximal to the projections of the brush illustrated previously in FIGS. 13, 25A and 25B. The second collar may be smaller in diameter than the outermost diameter of the abrasive nodules for limiting the abrasion performed on a workpiece.

Abrasive Leveling Mechanism

Figure 14:
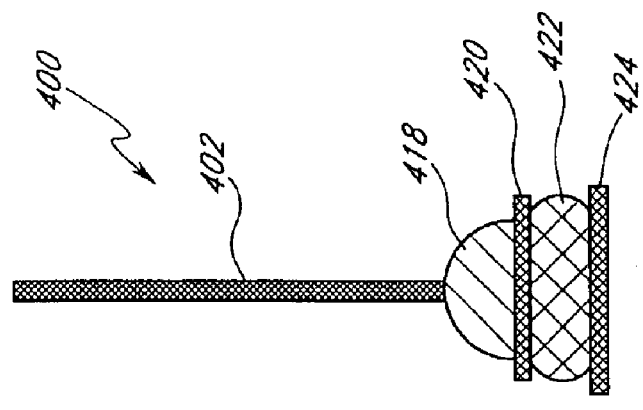
FIG. 14 is a side view of another embodiment of an abrasive mechanism having an additional abrasive leveling portion located at the distal end of the working shaft.

FIG. 14 illustrates the distal end portion 400 of a burr removal apparatus in accordance with another preferred embodiment of the present invention. This embodiment has an abrasive mechanism 418 and further comprises a leveling mechanism 422. The leveling mechanism 422 is preferably located distal to the abrasive mechanism 418 at the distal end of the working shaft 402. The leveling mechanism 422 is preferably larger in diameter than the abrasive mechanism 418 and provides a means for leveling out large burrs before using the abrasive mechanism 418 (in the manner generally described above). In the embodiment illustrated in FIG. 14, the leveling mechanism 422 is located between a first protective collar 420 and a second protective collar 424. Because the leveling mechanism 422 is used to remove large burrs, the abrasive material on the leveling portion 422 is preferably more coarse than on the abrasive mechanism 418.

FIGS. 15A through 15C illustrate the use of the embodiment of the present invention just described with reference to FIG. 14. As shown in FIG. 15A, the leveling portion 422 does not contact the sidewall 430A of the workpiece 430 during advancement because the diameter of the second protective ring 424 is slightly larger than the diameter of the leveling portion 422. Preferably, the diameter of the first protective ring 420 is approximately the same size or slightly larger than the diameter of the leveling portion 422.

Figure 16A:
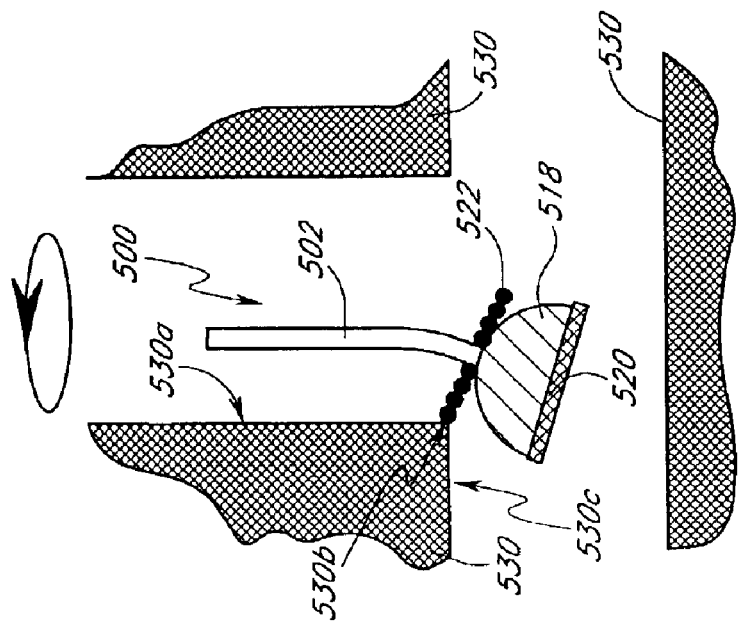
FIGS. 16A–B are side views of another embodiment of an abrasive mechanism having an additional abrasive ring during use on a workpiece.
Figure 16B:
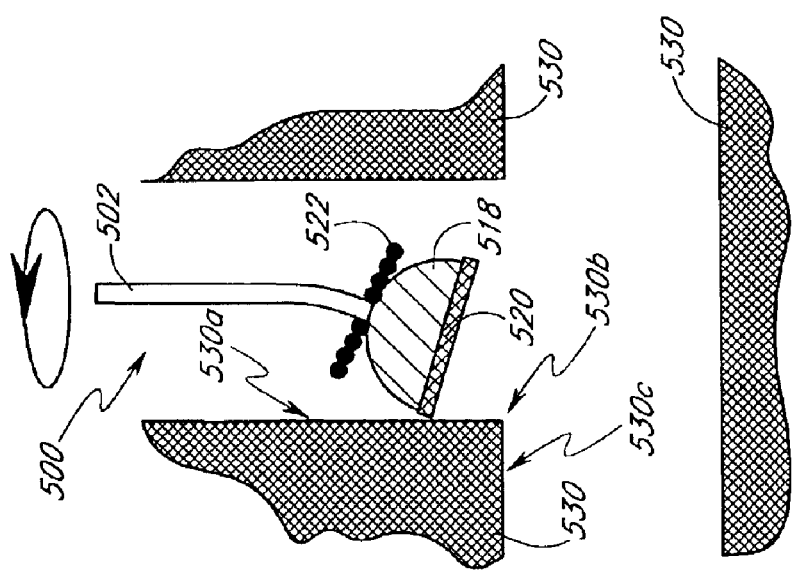

Therefore, as illustrated in FIG. 15B, the leveling portion 422 provides a means for removing unwanted projections from the sidewall 430A in the region near the corner 430B as the second protective ring 424 is advanced beyond the corner 430B. After the leveling portion 422 has been used to remove large burrs or other projections, the abrasive mechanism 418 may then be used to round off or polish the corner 430B, as illustrated in FIG. 15C Abrasive Ring Mechanism FIGS. 16A and 16B illustrate the distal end portion 500 of a burr removal apparatus in accordance with another preferred embodiment of the present invention. In this embodiment, a rotatable shaft 502 has at one end thereof a first abrasive mechanism 518, a collar 520 and a second abrasive mechanism 522, extending laterally as a plate of finite thickness or as a collection of abrasive projections. The distal end portion 500 of the burr removal apparatus is advanced through the workpiece 530, as shown in FIG. 16A, such that the collar 520 rides along the wall 530A. When the first abrasive mechanism 518 has removed the burrs from the corner 530B of the workpiece 530, the tool is advanced into a second position, as shown in FIG. 16B. In this position, the second abrasive mechanism 522 provides abrasive action along the side wall 530A and corner 530B of the workpiece 530. The abrasive ring may also be positioned to extend onto surface 530C if desired. The first and second abrasive mechanisms, 518 and 522, are preferably of different abrasive materials (e.g., for rough deburring and for edge finishing, respectively). Therefore, at least two different deburring tasks can be performed without changing an abrasive mechanism or removing the distal end portion 500 of the burr removal apparatus from the workpiece 530.

Pivotally Mounted Abrasive Mechanisms

FIGS. 17A and 17B illustrate the distal end portion 600 of a burr removal apparatus in accordance with another preferred embodiment of the present invention. In this embodiment, the abrasive mechanism 618, which extends laterally from a rotatable working shaft 602, can be rotated to an arbitrary angle relative to the shaft 602. This feature advantageously allows the abrasive mechanism 618 to be tilted relative to the working shaft 602, as shown in FIG. 17B, while the working shaft 602 and abrasive mechanism 618 are rotated.

The cross-sectional shape of the abrasive mechanism 618 is preferably concave and has at least one linear segment (or is polygonal), with geometric parameters that enable the abrasive mechanism 618 to remove burrs on a sharply angled polygonal corner 630B (e.g., a right angle corner), as illustrated in FIG. 17B. The surface of the abrasive mechanism 618 can be a relatively hard abrasive for rough deburring or can be a relatively soft abrasive for surface finishing. Preferably, the device includes one, two or more nonabrasive collars, 620A and 620B, to protect the side wall 630A as the abrasive mechanism 618 is moved into position or is removed from the workpiece 630, as illustrated in FIG. 17A.

FIG. 17C is a top view of the abrasive mechanism 618 illustrating one embodiment in which the working shaft 602 is coupled to the abrasive mechanism 618 such that the abrasive mechanism 618 may pivot relative to the working shaft 602. The working shaft 602 has an X-shaped cross-section that fits through a similarly shaped hole 604 extending through the abrasive mechanism 618. The hole 604 is larger than the working shaft 602 and therefore the abrasive mechanism 618 may pivot, within a limited range, about the shaft 602.

Referring again to FIGS. 17A and 17B, a bottom plate 606 is attached to the distal end of the working shaft 602 that prevents the abrasive mechanism 618 from sliding off the working shaft 602. A coiled spring 608 is fitted over the shaft. The top end of the spring 608 is maintained on the shaft 602 by a top plate 610. The bottom end of the spring 608 engages the top of the abrasive mechanism 618 thereby pushing the abrasive mechanism 618 against the bottom plate 606. As the shaft 602 rotates about its central axis, the abrasive mechanism 618 also rotates to abrade a surface. As illustrated in FIG. 17B, due to the coupling mechanism, the abrasive mechanism 618 is able to tilt such that it can maintain constant engagement with the corner 630B of the workpiece 630 at all times.

FIGS. 18A and 18B illustrate the distal end portion 700 of a burr removal apparatus in accordance with another preferred embodiment of the present invention. In this embodiment, a spherically shaped ball 704 is fixedly attached to the distal end of the working shaft 702 and an abrasive mechanism 718 is movably coupled to the ball 704. In the illustrated embodiment, the abrasive mechanism 718 is formed as a disc-shaped member located between first and second protective collars, 720A and 720B. A hole 710 extends through the abrasive mechanism 718 and collars 720A, 720B. The hole 710 is shaped to conform to the surface of the ball 704. The middle of the ball 704 (wherein the diameter is largest) is located within the center of the abrasive mechanism 718 and therefore the ball 704 is locked within the abrasive mechanism 718. However, the abrasive mechanism 718 is free to pivot or tilt relative to the ball 704 such that the central axis of the abrasive mechanism 718 is different than the axis of the working shaft 702 as illustrated in FIG. 18A.

In order to ensure that the abrasive mechanism 718 rotates with the working shaft 702, the exterior of the ball is provided with a key 712 that fits into a slot 714 formed along the hole 710 in the abrasive mechanism 718, as illustrated in FIG. 18B. With the key 712 in the slot 714, the abrasive mechanism 718 rotates with the working shaft 702 and, at the same time, the edge of the abrasive mechanism 718 is free to tilt up and down. Therefore, edge of the abrasive mechanism is able to maintain constant contact with the corner 730B of the workpiece 730 as the working shaft 702 is rotated, as illustrated in FIG. 18A. In the illustrated embodiment, the cross-sectional shape of the abrasive mechanism 718 is curvilinear and concave, to more easily abrade a rounded corner 730B on a workpiece 730.

Guide Sleeve

Figure 19:
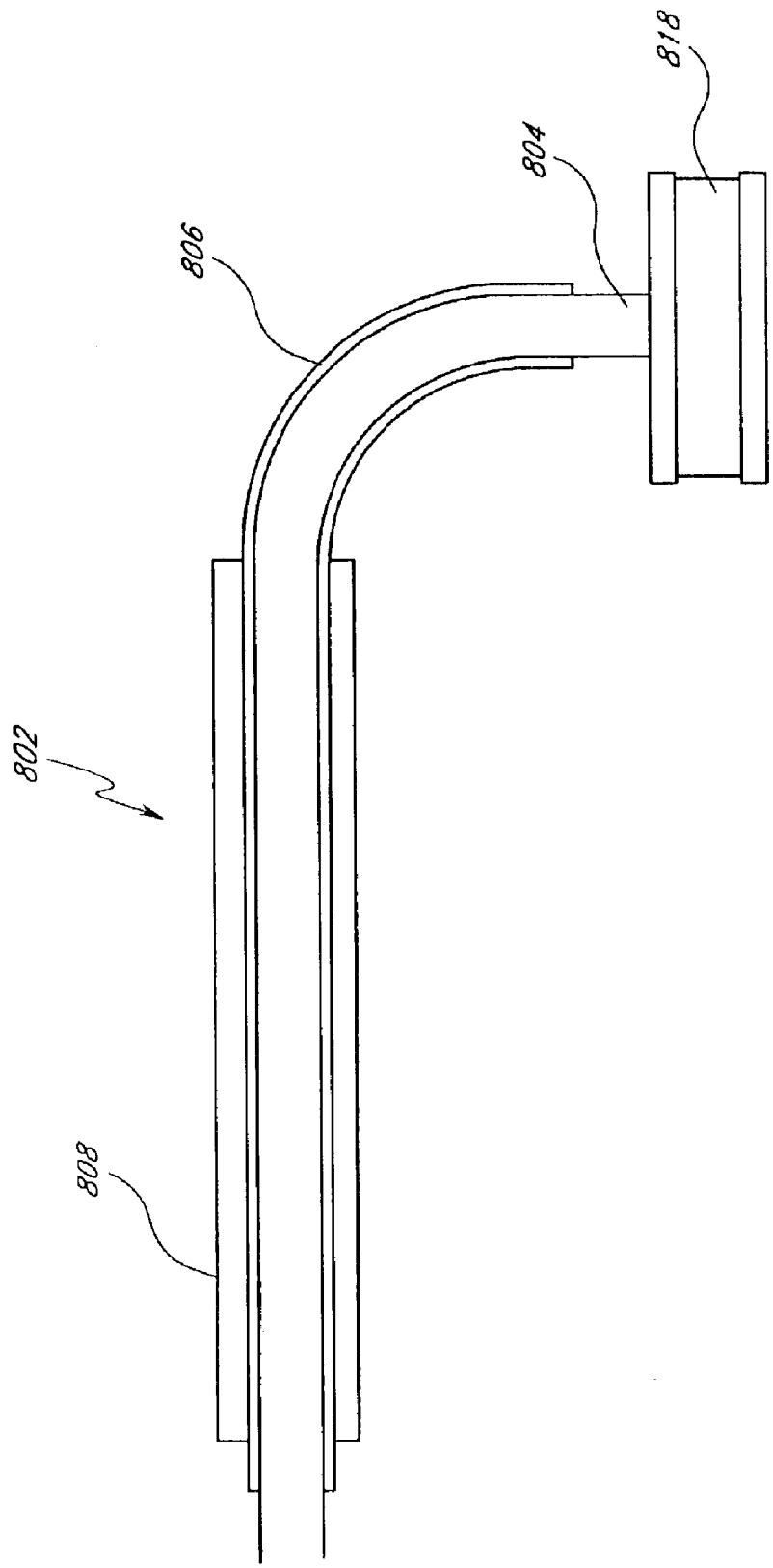
FIG. 19 is a cross-sectional view of a flexible shaft used to steer an abrasive mechanism.

FIG. 19 illustrates another embodiment of the present invention wherein the working shaft 802 can be steered to help navigate an abrasive mechanism 818 into a difficult area within a workpiece. In this embodiment, the working shaft 802 includes a superelastic core 804 that easily bends into an arc. The shaft 802 also includes: a partly flexible shaft guide sleeve 806 that covers most of, and may but need not rotate with, the shaft core 804; and an inflexible guide sleeve 808 that covers part of the shaft guide sleeve 806 and does not rotate.

Anti-Vibration Mechanism (Shaft Restrictor)

Figure 20:
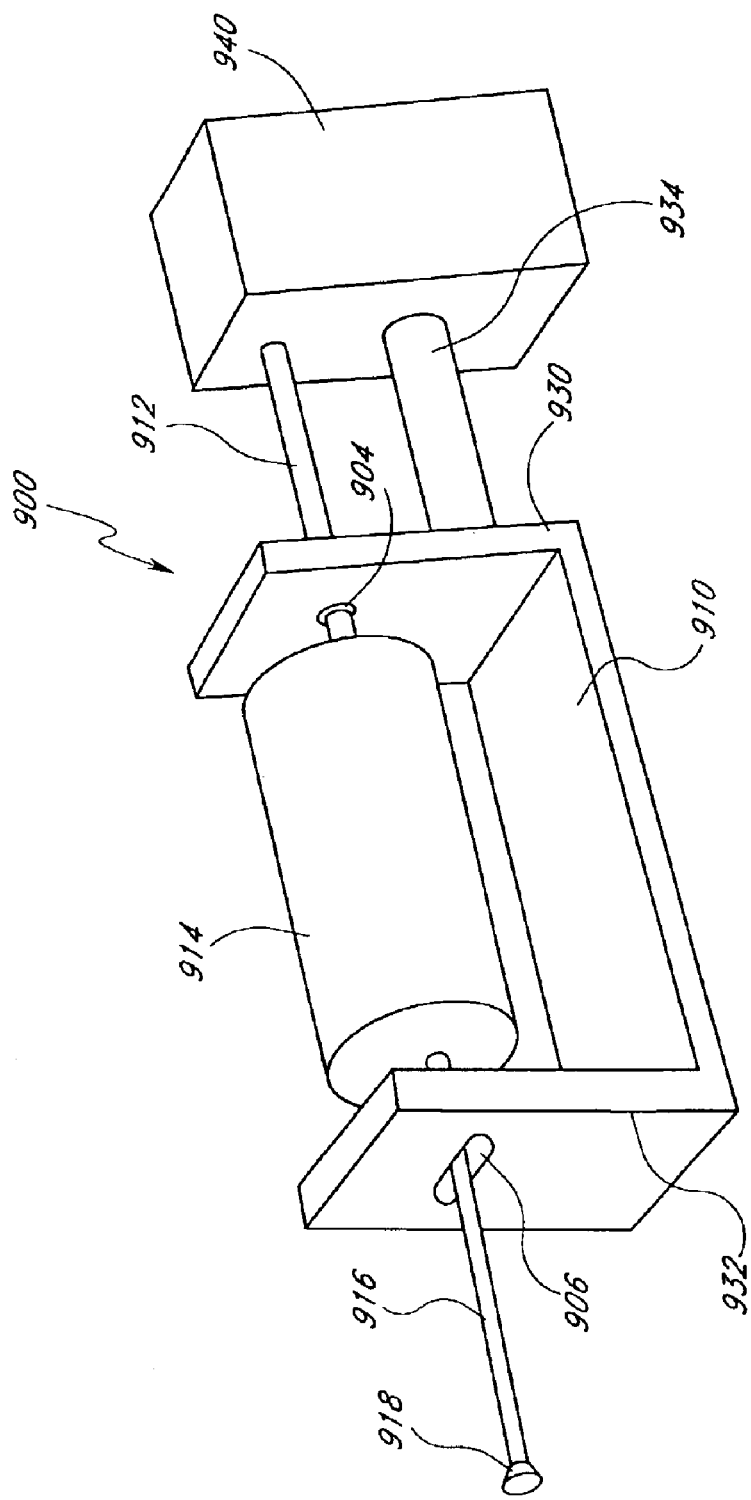
FIG. 20 is an perspective view showing one embodiment of a shaft restrictor according to the present invention.

FIG. 20 illustrates an anti-vibration mechanism 900 that can be advantageously used with any of the previously described embodiments of the present invention. The anti-vibration mechanism 900 provides a means for improving the surface finish of a workpiece by reducing undesirable vibration and restricting movement of the working shaft 916. The shaft restrictor 900 is adapted to restrict undesirable lateral motion of a working shaft 916 as the shaft 916 turns and the abrasive mechanism 918 encounters mechanical resistance. The drive shaft 912 extends through a first aperture 904 on a back wall 930 of the bracket 910. Preferably, the back wall 930 is connected or rigidly attached to a shaft driver mechanism 940 (e.g., a motor), or to some other relatively rigid device, by a second plate or anchor 934. This connection assures that the back wall 930 does not move relative to the shaft drive mechanism 940 as the drive shaft 912 turns. Preferably, the diameter of the first aperture 904 is slightly larger than the diameter of the drive shaft 912 and may include a bushing to minimize any frictional force produced by the rotation of the drive shaft 912.

The front wall 932 of the bracket 910 includes an aperture 906 that permits motion of a shaft 916 in one lateral direction (x) but prevents motion of the shaft in a second lateral direction (y). This embodiment of a shaft restrictor will be particularly useful where the abrasive mechanism 918 and shaft 916 must move in one lateral direction to follow the contours of the workpiece to be deburred. The flexible coupling member 914 allows the drive shaft 912 to deflect relative to the working shaft 916.

In an alternative embodiment of a shaft restrictor, the aperture in the front wall may be a circular hole that restricts all lateral motion of the working shaft 916. The presence of the two aligned apertures at spaced apart locations ensures that the drive shaft 912 and the working shaft 916 are aligned and move at most a minimal lateral distance as they rotate. Although only one embodiment of a shaft restrictor has been illustrated herein, any other shaft restrictor capable of achieving the same result is intended to be included within the scope of this invention.

Preferred Shapes of Abrasive Mechanism

Figure 21:
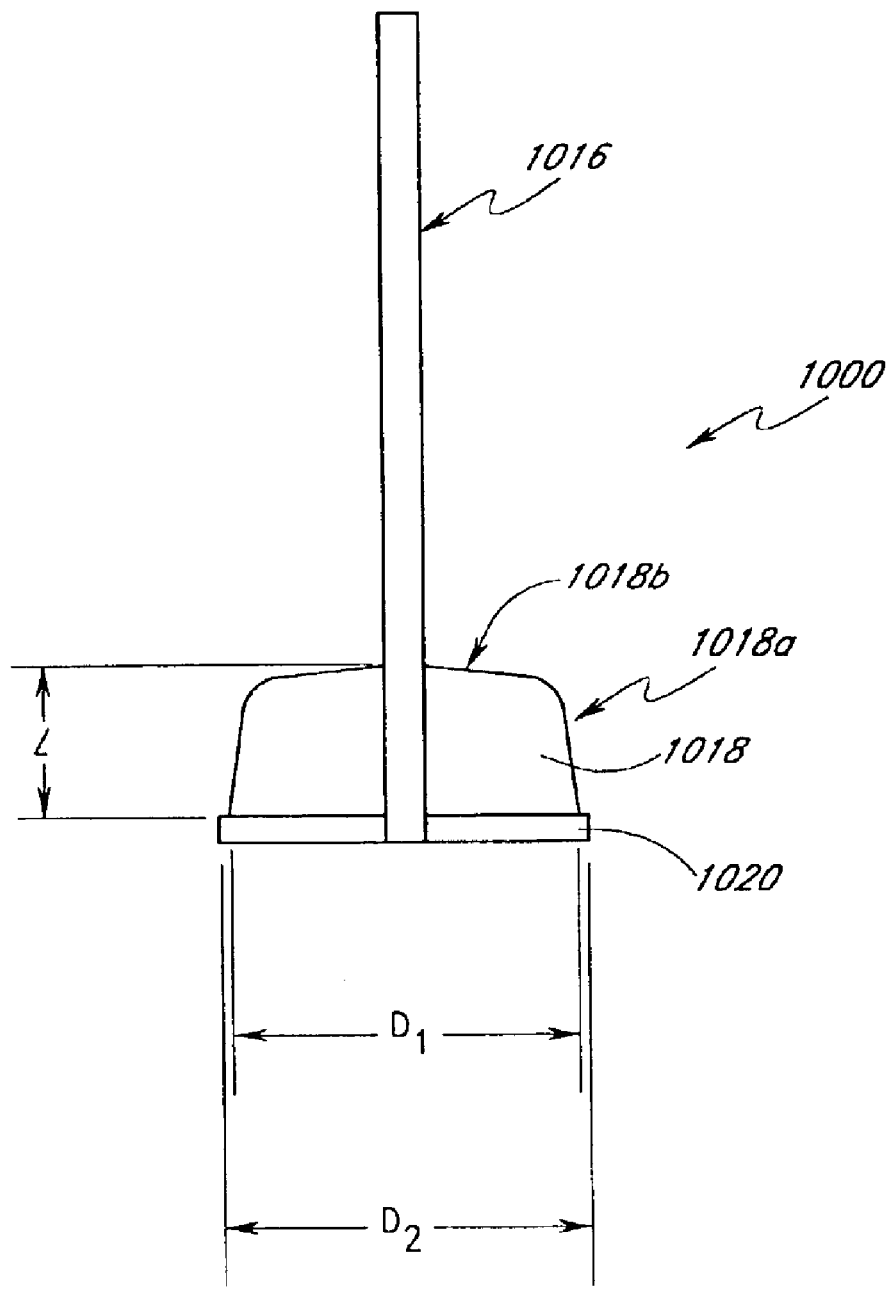
FIG. 21 is a side view showing one preferred shape for an abrasive mechanism.

The preferred shape of the abrasive mechanism will depend largely on the shape of the surface to be deburred. Various desirable cross-sections may include ovular, quadrilateral, trapezoidal or polygonal. FIG. 21 illustrates the distal end portion 1000 of a burr removal tool having an abrasive mechanism 1018 with one preferred shape. The illustrated shape is particularly well-suited for removing burrs and other unwanted material from a corner location in a workpiece. The angular difference between the side 1018A and the top 1018B of the abrasive mechanism 1018 provides the user with excellent control over the lateral and longitudinal movement of the device as it moves around the corner of a workpiece. As seen in FIG. 21, the top 1018B of the abrasive mechanism 1018 is nearly perpendicular to the working shaft 1016. This feature allows the device to extend deeply around a corner to ensure that the burr removal is complete. The length L of the abrasive mechanism 1018 can be varied according to the desired use and the size of the space in which the device is utilized.

As discussed above, a significant feature of the present invention is the inclusion of a protective collar 1020 having a diameter $D_2$ larger than the diameter $D_1$ of the abrasive mechanism 1018. This feature ensures that the abrasive mechanism 1018 does not inadvertently damage the part as the tool is advanced toward the location to be deburred. It will be appreciated that the difference in diameters between $D_1$ and $D_2$ affects the amount of material contacted by the abrasive mechanism 1018 when the device is used to deburr an edge at the intersection of two through holes.

Multiple Tools on a Rotating Base

Figure 22A:
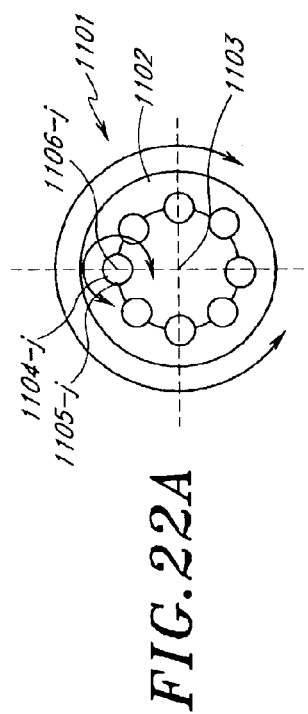
FIG. 22A is a cross-sectional view showing a rotating base that can house numerous tools for burr removal and edge finishing.
Figure 22B:
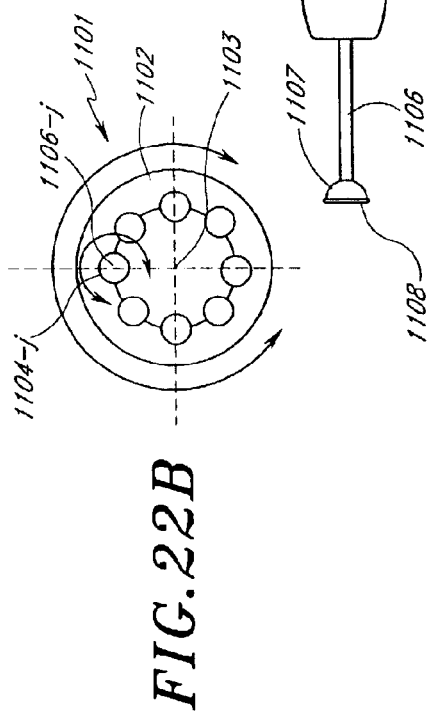
FIG. 22B is a cross-sectional view showing another rotating base that can house numerous tools wherein no shaft driver mechanism is included.

FIGS. 22A and 22B are end views illustrating an arrangement that incorporates some of the invention's features in a milling machine or lathe, for example, as a retrofit arrangement. FIG. 22A illustrates a rotatable base 1102 having a longitudinal central axis 1103 and having one or more apertures 1104-j formed in a rotatable base 1102. One or more of the apertures has a subsidiary rotation mechanism 1105-j positioned therein that provides independent rotation of a working shaft 1106-j having a working tip (e.g. an abrasive mechanism). The subsidiary rotation mechanism 1105-j can serve as a shaft drive mechanism for a burr removal system (similar to the shaft drive mechanism shown as 21 in FIGS. 1A and 1B). For example, the rotatable base 1102 can rotate about its axis 1103 in a clockwise direction, and the subsidiary rotation mechanism 1105-j can independently rotate the shaft 1106-j in a clockwise or counterclockwise direction, as illustrated by the arrows in FIG. 22A. This feature provides a "turret" mechanism which allows a wide variety of burr removal and edge finishing tools to be simultaneously incorporated into a single mechanism. Rotation of the turret allows the user to select and interchange tools in a quick and easy manner.

Alternatively, each of the apertures may be provided without a shaft drive mechanism, as illustrated in FIG. 22B. In this embodiment, rotation of the shaft 1106-j may be provided by an external source, such as, for example, a pneumatic pump or an electrical motor that provides power to each of the working shafts.

Figure 23:
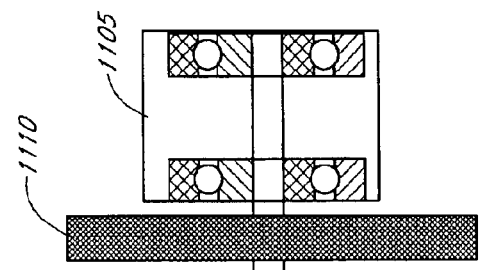
FIG. 23 is a side view of another embodiment of a burr removal tool including a flywheel that may be used with the rotating bases illustrated in FIGS. 22A.

FIG. 23 is a side view illustrating a subsidiary rotation mechanism 1105 that may be located within an aperture of the rotatable base 1102 shown in FIG. 22A. The subsidiary rotation mechanism 1105 is connected to an abrasive mechanism 1107 and associated collar 1108 through a rotatable working shaft 1106. Preferably, the shaft 1106 is capable of moving longitudinally, to position the abrasive mechanism 1107 relative to a workpiece (not shown). In the embodiment illustrated in FIG. 23, the shaft 1106 further comprises a flywheel 1110 (or other similar rotatable mass) that provides a rotational inertia storage mechanism. The subsidiary rotation mechanism 1105 is activated to increase the rotational speed of the shaft 1106. Once the shaft 1106 has reached an appropriate angular velocity, the shaft is moved longitudinally along the axis of the shaft 1106 until the abrasive mechanism 1107 engages a portion of the work surface to be deburred. The subsidiary rotation mechanism 1105 may continue in its activated state to rotate the shaft 1106 and the abrasive mechanism 1107.

Alternatively, the subsidiary rotation mechanism 1105 can be deactivated or turned off. In this embodiment, the shaft 1106, the abrasive mechanism 1107 and the associated collar 1108 will continue to rotate at an angular velocity that slowly decreases due to internal friction and due to friction encountered by the abrasive mechanism 1107 as one or more burrs are removed. Inclusion of the rotatable mass 1110 on the shaft 1106 provides additional rotational inertia ($Iw^2$, where I is the moment of inertia of the rotatable mass alone) that helps to sustain the angular velocity in the presence of friction. The rotatable mass 1110 allows the burr removal tool to be used for a substantial period of time in the absence of a power source.

Preferred Materials

The abrasive material used in an abrasive mechanism may include one or more materials, such as, for example, high-carbon steel, metal impregnated with alumina or boron nitride or boron carbide or diamond fragments, titanium, tungsten, a wire bristles, plastic bristles impregnated with an abrasive material, a polishing stone or any other suitable burr removal material having a Mohs hardness substantially greater than that of most metals (i.e., at least equal to about 5.5). When used to abrade metal, the abrasive mechanism is preferably made of tungsten carbide.

The non-abrasive material used in a protective collar may be a plastic or other sacrificial material or may be a material with a Mohs hardness index that is below but near that of the metal from which burrs are to be removed. Many metals have Mohs hardness indices of around 5.5 so that a non-abrasive material with a Mohs hardness index in the range 3–5 may be suitable. Non-abrasive materials which may be used with the protective collar include, wood, plastic, rubber, polished metal or any other material with a Mohs hardness less than 5.5.

Operation

FIGS. 24A through 24D are cross-sectional views of the interior of a metallic workpiece illustrating an exemplary use of the invention for removing burrs at a location where two apertures intersect to form a "T-shaped" hole. The breakthrough of the drill hole for the second aperture 2 into the first aperture 4 will produce an ellipsoid shaped edge that may include metal burrs 6. The burrs 6 located along this ellipsoid are typically very difficult to remove due to their locations within the workpiece. Furthermore, conventional burr removal tools are not well-suited for this purpose because the ellipsoid edge is non-planar due to the geometry of intersecting holes. However, the burr removal tool of the present invention is well-suited for removing burrs from such a workpiece. The operation of the burr removal tool will be described with reference to the embodiment of the present invention described in FIGS. 1A and 1B.

In FIG. 24A, the rotating tool 10 is being advanced longitudinally through an aperture in a workpiece as the workpiece 8 is being rotated about the central axis A-A of the aperture. The tool 10 is advanced along a path that is parallel to the axis of rotation of the workpiece 8. During the initial advancement into the workpiece 8, the tool 10 moves through the aperture 4 without touching the wall of the aperture.

As shown in FIG. 24B, once the tool 10 is near the edge 6, the tool 10 is moved laterally relative to the aperture such that the collar 20 comes into contact with the wall of the aperture. The collar 20 protects the wall of the aperture by holding the abrasive mechanism 18 away from the surface. Because of this hold-off, the working shaft 16, to which the abrasive mechanism 18 and collar 20 are connected, is positioned at a non-zero angle $\theta$ relative to an adjacent surface of the workpiece 8. This non-zero angle $\theta$ is achieved by application of a lateral force $F_L$ that bends or otherwise reorients a longitudinal axis of the shaft 16, which is held by a drive mechanism and shaft holder (as described with reference to FIG. 20).

As shown in FIG. 24C, the tool is then advanced further through the aperture along a path that is eccentric from the axis of rotation of the workpiece. When the collar 20 advances beyond a corner C of the workpiece, the collar 20 drops down and the angle between the working shaft 16 and the adjacent surface of the workpiece is reduced. However, this angle fluctuates as the workpiece 8 is rotated because the collar 20 will come in and out of contact with the side wall of the second aperture 2. FIG. 24C illustrates the workpiece 8 with the second aperture 2 in a position that is perpendicular to the illustrated view. In this position, the collar 20 contacts the side wall of the aperture.

In contrast, FIG. 24D illustrates the workpiece 8 with the second aperture 2 rotated another 90 degrees. In this position, the abrasive mechanism comes into contact with the corner C where the first aperture 4 meets the second aperture 2. Therefore, as can be seen by this sequence of figures, the thickness of the collar will have direct affect on the amount of time that the abrasive mechanism 18 contacts the corner C of the aperture during a rotational cycle. Therefore, the amount of material removed from the workpiece can be controlled by adjusting the diameter of the collar relative to the diameter of the abrasive mechanism.

Each embodiment of the invention incorporates one or more of the following features: (1) provision of a non-abrasive collar, combined with an adjacent abrasive mechanism, to protect a surface from unintended abrasion when the system is being moved into position to remove one or more burrs; (2) provision of an abrasive mechanism having a cross-sectional shape that corresponds to the local shape of the surface from which one or more burrs is to be removed; (3) provision of a shaft that can be mechanically loaded or deflected to provide an abrasive mechanism with a directed force against a surface from which one or more burrs is to be removed; (4) provision of a shaft restrictor that restricts shaft motion in one or more lateral directions when the abrasive mechanism is rotating; and (5) use of rotational inertia storage to sustain rotation of the shaft(s), abrasive mechanism(s) and collar(s) after the shaft drive mechanism is turned off and the angular velocity decreases slowly due to frictional forces.

While embodiments and applications of this invention have been shown and described, it will be apparent to those skilled in the art that various modifications are possible without departing from the scope of the invention. It is, therefore, to be understood that within the scope of the appended claims, this invention may be practiced otherwise than as specifically described.

What is claimed is:

1. A burr removal apparatus, comprising:

an access device having proximal and distal end portions, said access device being rotatable about a longitudinal axis;

at least one abrasive mechanism disposed along said distal end portion of said access device, said abrasive mechanism having a first cross-sectional profile substantially greater than said access device, said abrasive mechanism being formed with a curved proximal surface shaped for abrading a corner of a workpiece along an intersection between a first aperture and a second aperture; and at least one non-abrasive member for protecting said workpiece against undesirable abrasion, said non-abrasive member having a second cross-sectional profile substantially greater than said abrasive mechanism, said non-abrasive member being positioned to protect said workpiece as said abrasive mechanism is advanced along said workpiece.

2. The apparatus of claim 1, wherein said non-abrasive member is mounted on said abrasive mechanism.

3. The apparatus of claim 1, wherein said non-abrasive member is mounted on said access device.

4. The apparatus of claim 1, wherein said non-abrasive member is mounted distal to said abrasive mechanism.

5. The apparatus of claim 1, wherein said non-abrasive member has a cross-section with a circular shape.

6. The apparatus of claim 1, wherein said abrasive mechanism is relatively small in relation to a perimeter of a surface to be de-burred.

7. The apparatus of claim 1, wherein said non-abrasive member is fixedly attached to said abrasive mechanism.

8. The apparatus of claim 7, wherein said collar extends around an exterior portion of said abrasive mechanism.

9. The apparatus of claim 7, wherein said non-abrasive member is fixedly attached to an exterior portion of said abrasive mechanism.

10. The apparatus of claim 7, wherein said abrasive mechanism is formed with a substantially spherical shape and said collar extends around an exterior central portion of said abrasive mechanism.

11. The apparatus of claim 1, wherein said access device can deflect or bend in a selected direction in response to a force exerted on said shaft in said selected direction.

12. The apparatus of claim 11, further comprising a coiled spring for coupling said distal end of said access device to said abrasive mechanism, said coiled spring being adapted to allow said abrasive mechanism to deflect relative to said access device.

13. The apparatus of claim 1, further comprising an abrasive ring coupled to said access device at a location proximal to said abrasive mechanism.

14. The apparatus of claim 1, wherein said abrasive mechanism is pivotally coupled to said distal end portion of said access device.

15. The apparatus of claim 1, wherein said access device is an elongate working shaft having a non-abrasive surface.

16. The burr removal apparatus of claim 1, wherein said curved proximal surface has a substantially hemi-spherical shape configured for slidable movement along said corner of said workpiece.

17. The burr removal apparatus of claim 1, wherein said non-abrasive mechanism is adapted to engage a wall of said workpiece during advancement through said first aperture.

18. A burr removal apparatus, comprising:
- a flexible elongate working shaft having proximal and distal end portions;
- an abrasive mechanism disposed along said distal end portion of said working shaft said abrasive mechanism formed with a curved proximal surface and having a diameter greater than at least a portion of said working shaft; and
- a non-abrasive member having a diameter greater than at least a portion of said abrasive mechanism;
- wherein said curved proximal surface of said abrasive mechanism is configured for abrading an edge of a workpiece and said flexible elongate working shaft is adapted to provide a lateral reaction force for maintaining contact between said abrasive mechanism and said edge.

19. A method for removing a burr from an edge of a workpiece, comprising:
- providing an elongate access device having a distal end portion;
- providing an abrasive mechanism along said distal end portion of said access device, said abrasive mechanism including a curved proximal surface formed with an abrasive material that can abrade said edge of said workpiece, said abrasive mechanism having a diameter greater than said access device;
- providing a non-abrasive member along said distal end portion of said access device that will not substantially abrade said workplace, said non-abrasive member having a diameter greater than said abrasive mechanism;
- rotating said access device relative to said workpiece;
- advancing said burr removal apparatus along a wall of said workpiece wherein said non-abrasive member engages said wall until said non-abrasive member is advanced distally of said edge of said workpiece such that said curved proximal surface of said abrasive mechanism contacts said edge; and
- removing at least one burr by abrading said edge through contact with said abrasive mechanism.

20. A burr removal apparatus, comprising:
- an access device configured for rotation about a longitudinal axis, said access device including a substantially rigid drive shaft having a distal end portion and an elongate working shaft having a non-abrasive surface and proximal and distal end portions;
- a flexible coupling member located between said distal end portion of said drive shaft and said proximal end portion of said working shaft for allowing said working shaft to deflect relative to said drive shaft;
- at least one abrasive mechanism disposed along said distal end portion of said working shaft, said abrasive mechanism having a first cross-sectional profile substantially greater than said working shaft, said abrasive mechanism being formed with an abrasive material for abrading a selected section of a workpiece; and
- at least one non-abrasive member for protecting said workpiece against undesirable abrasion, said non-abrasive member having a second cross-sectional profile substantially greater than said abrasive mechanism, said non-abrasive member being positioned to protect said workpiece as said abrasive mechanism is advanced along said workpiece.

21. A burr removal apparatus for abrading a corner of a workpiece, comprising:
- a flexible access device having proximal and distal end portions, said access device being rotatable about a longitudinal axis;
- at least one abrasive mechanism disposed along said distal end portion of said access device, said abrasive mechanism having a substantially hemi-spherical shape wherein at least a portion of said abrasive mechanism is substantially greater in diameter than said access device; and
- at least one non-abrasive member fixedly attached to said abrasive mechanism, said non-abrasive member having an outer diameter greater than a maximum diameter of said abrasive mechanism for protecting a wall of said workpiece against undesirable abrasion.

22. A burr removal apparatus for abrading a corner of a workpiece, comprising:
- a flexible elongate access device having proximal and distal end portions, said access device being rotatable about a longitudinal axis;
- at least one abrading means for abrading said corner of said workpiece, said abrading means being disposed along said distal end portion of said access device and having a maximum diameter greater than said access device; and
- at least one non-abrasive member fixedly attached to said abrading means, said non-abrasive member having an outer diameter greater than said maximum diameter of said abrading means for protecting a wall of said workpiece against undesirable abrasion.

23. A method for removing a burr from an edge of a workpiece, comprising:
- providing a flexible elongate access device having a distal end portion;
- providing an abrasive mechanism along said distal end portion of said access device, said abrasive mechanism including a curved proximal surface formed with an abrasive material;
- providing a non-abrasive member along said distal end portion of said access device that will not substantially abrade said workpiece, said non-abrasive member having a diameter greater than said abrasive mechanism;
- rotating said access device relative to said workpiece;
- applying a lateral force such that said non-abrasive member engages a wall of the workpiece and said flexible elongate access device bends;
- advancing said burr removal apparatus along the wall of said workpiece until said non-abrasive member is advanced distally of said edge of said workpiece such that said curved proximal surface of said abrasive mechanism slides along said edge; and
- removing at least one burr from said edge while said flexible elongate access device provides a reaction force for maintaining contact between said abrasive mechanism and said edge.

24. The method of claim 23 wherein said flexible elongate access device is advanced longitudinally relative to said workpiece while abrading said edge.

* * * * *